(12) United States Patent
Lof et al.

(10) Patent No.: US 12,053,827 B2
(45) Date of Patent: Aug. 6, 2024

(54) TURNING INSERT FOR METAL CUTTING

(71) Applicant: AB SANDVIK COROMANT, Sandviken (SE)

(72) Inventors: Ronnie Lof, Sandviken (SE); Fredrik Marell, Gavle (SE)

(73) Assignee: AB Sandvik Coromant, Sandviken (SE)

( * ) Notice: Subject to any disclaimer, the term of this patent is extended or adjusted under 35 U.S.C. 154(b) by 470 days.

(21) Appl. No.: 17/611,518

(22) PCT Filed: Feb. 6, 2020

(86) PCT No.: PCT/EP2020/052926
§ 371 (c)(1),
(2) Date: Nov. 15, 2021

(87) PCT Pub. No.: WO2020/228999
PCT Pub. Date: Nov. 19, 2020

(65) Prior Publication Data
US 2022/0234115 A1 Jul. 28, 2022

(30) Foreign Application Priority Data
May 16, 2019 (EP) .................................... 19174816

(51) Int. Cl.
*B23B 27/16* (2006.01)
(52) U.S. Cl.
CPC .. *B23B 27/1614* (2013.01); *B23B 2200/0461* (2013.01); *B23B 2200/165* (2013.01);
(Continued)

(58) Field of Classification Search
CPC ...... B23B 2200/0461; B23B 2200/321; B23B 27/1614; B23B 2200/165; B23B 2205/12; B23B 2205/16
See application file for complete search history.

(56) References Cited

U.S. PATENT DOCUMENTS 5,046,899 A * 9/1991 Nishi .................... B23B 27/143
407/113
5,205,680 A * 4/1993 Lindstedt .............. B23B 27/045
407/116

(Continued)

FOREIGN PATENT DOCUMENTS

DE 4244316 A1 * 6/1994 ......... B23B 27/1614
DE 29721160 U1 2/1998

(Continued)

*Primary Examiner* — Sara Addisu
(74) *Attorney, Agent, or Firm* — Corinne R. Gorski

(57) ABSTRACT

A turning insert includes a top surface, an opposite bottom surface, and a reference plane therebetween. A center axis intersects the top and bottom surfaces and a side surface connects the top and bottom surfaces. A circular cutting edge is adjacent the top surface and the side surface. The top surface includes a set of first protrusions, which are elongated in a direction parallel to the adjacent cutting edge. A greatest distance from the reference plane to the first protrusions is greater than a distance from the reference plane to the cutting edge. The bottom surface has a set of radial grooves and includes a set of flat surfaces. The flat surfaces extend in a plane parallel to the reference plane, wherein in a top view each first protrusion is symmetrical in relation to a line extending between the center axis and a mid-point of the first protrusion.

16 Claims, 13 Drawing Sheets

(52) U.S. Cl.
CPC ..... *B23B 2200/321* (2013.01); *B23B 2205/12* (2013.01); *B23B 2205/16* (2013.01)

(56) References Cited

U.S. PATENT DOCUMENTS

| | | | | |
|---|---|---|---|---|
| 5,236,288 | A * | 8/1993 | Flueckiger | B23C 5/2213 407/62 |
| 5,478,175 | A * | 12/1995 | Kraemer | B23B 27/16 407/7 |
| 5,658,100 | A * | 8/1997 | Deiss | B23C 5/2213 407/53 |
| 5,924,826 | A * | 7/1999 | Bystrom | B23B 29/046 407/103 |
| 5,931,613 | A * | 8/1999 | Larsson | B23B 27/08 407/103 |
| 5,934,844 | A * | 8/1999 | Woolley | B23B 27/143 407/115 |
| 6,599,061 | B1 * | 7/2003 | Nelson | B23B 27/143 407/115 |
| 6,796,752 | B2 * | 9/2004 | Tong | B23B 27/045 407/115 |
| 6,926,472 | B2 * | 8/2005 | Arvidsson | B23B 27/12 407/92 |
| 6,960,049 | B2 * | 11/2005 | Inayama | B23B 27/08 407/103 |
| 7,101,122 | B2 * | 9/2006 | Horiike | B23C 5/2247 407/115 |
| 7,121,771 | B2 * | 10/2006 | Englund | B23B 27/1622 407/111 |
| 7,201,545 | B2 * | 4/2007 | Ejderklint | B23C 5/2213 407/101 |
| 7,607,867 | B2 | 10/2009 | Benson | |
| 8,408,848 | B2 * | 4/2013 | Hecht | B23B 27/143 407/115 |
| 8,573,903 | B2 * | 11/2013 | Morrison | B23C 5/2213 407/115 |
| 8,858,130 | B2 * | 10/2014 | Morrison | B23C 5/06 407/62 |
| 9,011,049 | B2 * | 4/2015 | Fang | B23C 5/2213 407/113 |
| 9,180,533 | B2 * | 11/2015 | Hoffer | B23C 5/003 |
| 9,545,671 | B2 * | 1/2017 | Pacheri | B23B 27/143 |
| 10,183,333 | B2 * | 1/2019 | Hecht | B23B 27/141 |
| 11,396,051 | B2 * | 7/2022 | Maier | B23B 27/1611 |
| 11,786,982 | B2 * | 10/2023 | Dufour | B23C 5/06 407/113 |
| 2003/0210961 | A1 * | 11/2003 | Arvidsson | B23C 5/2247 407/113 |
| 2005/0244233 | A1 * | 11/2005 | Jonsson | B23B 27/1618 407/115 |
| 2006/0051167 | A1 * | 3/2006 | Massa | B23B 27/164 407/103 |
| 2006/0056928 | A1 * | 3/2006 | Riviere | B23C 5/1045 407/113 |
| 2007/0101837 | A1 * | 5/2007 | Hyatt | B23B 27/10 82/1.11 |
| 2007/0274791 | A1 * | 11/2007 | Pantzar | B23B 27/1611 76/115 |
| 2008/0145159 | A1 * | 6/2008 | Benson | B23B 27/164 407/114 |
| 2011/0164934 | A1 * | 7/2011 | Chen | B23B 27/143 407/116 |
| 2012/0087751 | A1 * | 4/2012 | Yamaguchi | B23B 27/143 407/115 |
| 2014/0212226 | A1 * | 7/2014 | Saji | B23C 5/109 407/33 |
| 2016/0207124 | A1 * | 7/2016 | Brown | B23C 5/2213 |
| 2017/0165757 | A1 * | 6/2017 | Goldsmith | B23P 15/28 |
| 2020/0198018 | A1 * | 6/2020 | Gonzui | B23B 1/00 |
| 2023/0191499 | A1 * | 6/2023 | Kim | B23B 27/143 407/30 |

FOREIGN PATENT DOCUMENTS

| | | | | |
|---|---|---|---|---|
| WO | 97/11806 | A1 | 4/1997 | |
| WO | 2004056515 | A1 | 7/2004 | |
| WO | 2007001224 | A1 | 1/2007 | |
| WO | WO-2007001224 | A1 * | 1/2007 | ......... B23B 27/1625 |
| WO | 2009025918 | A2 | 2/2009 | |
| WO | 2017060027 | A1 | 4/2017 | |

* cited by examiner

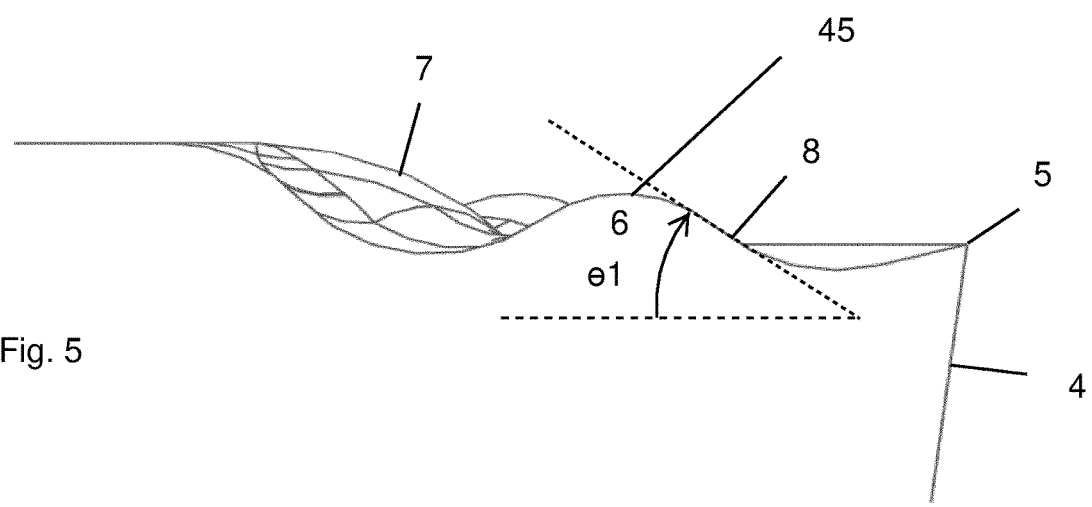
Fig. 5
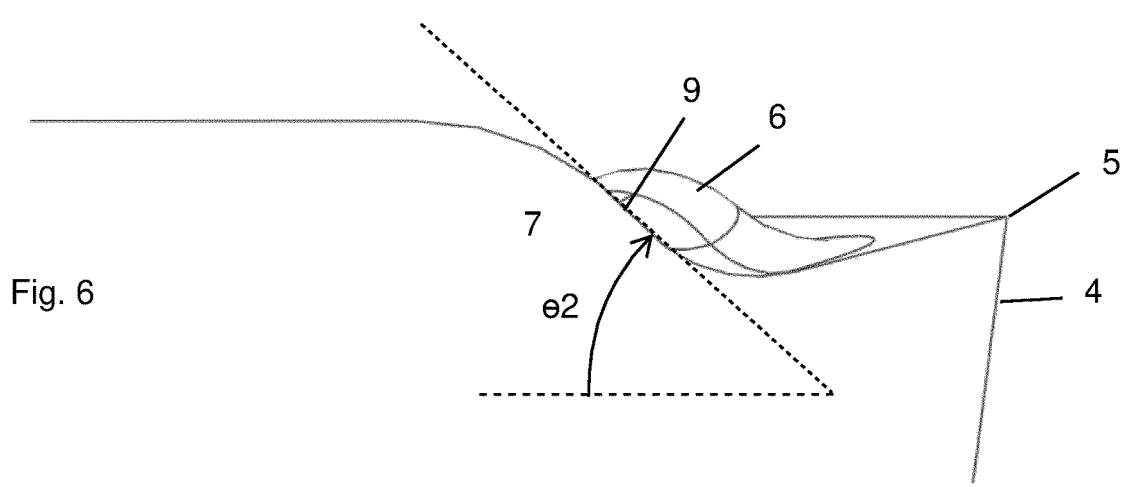
Fig. 6
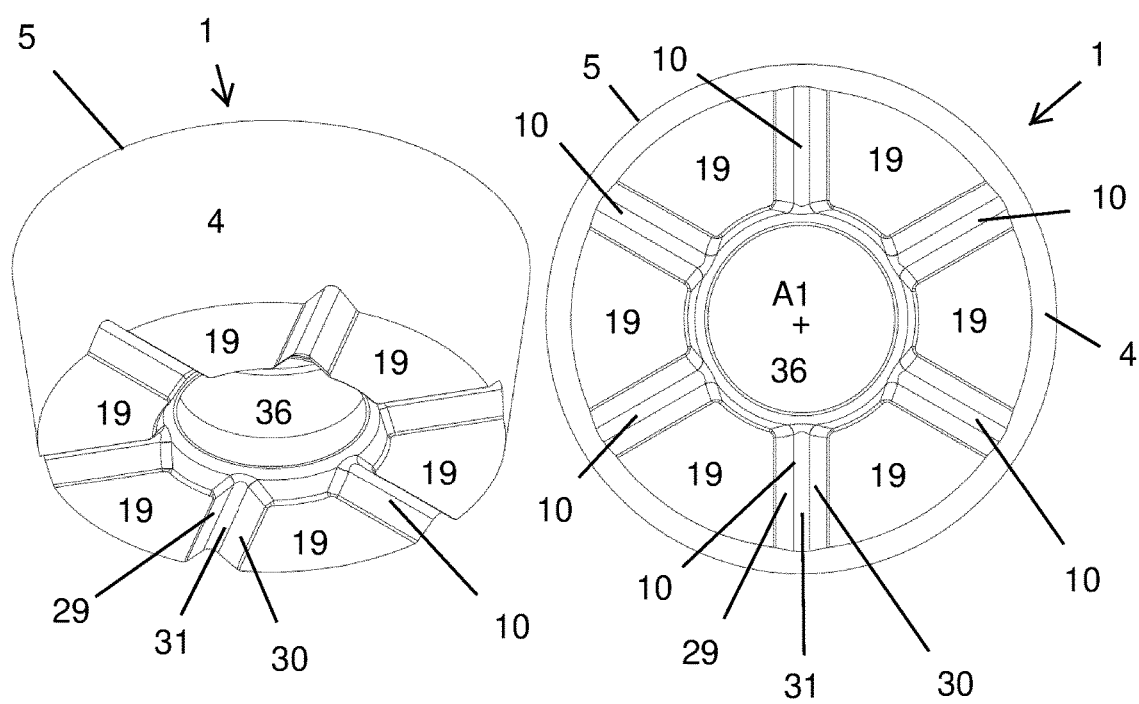
Fig. 7
Fig. 8

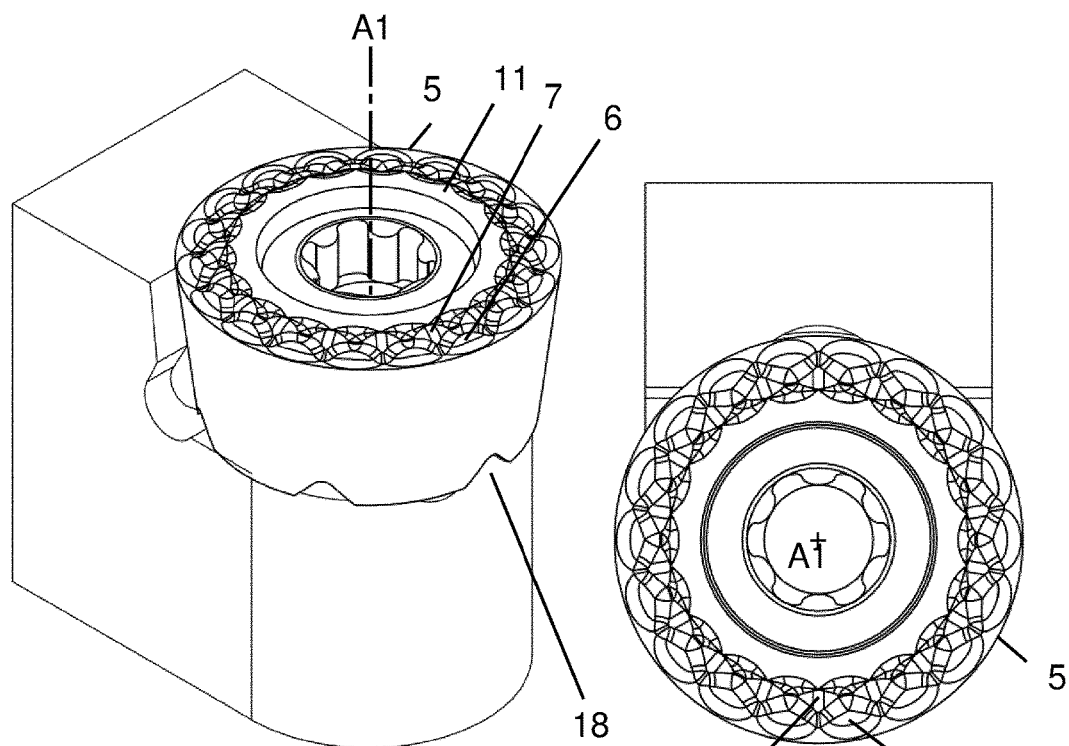
Fig. 17
Fig. 18
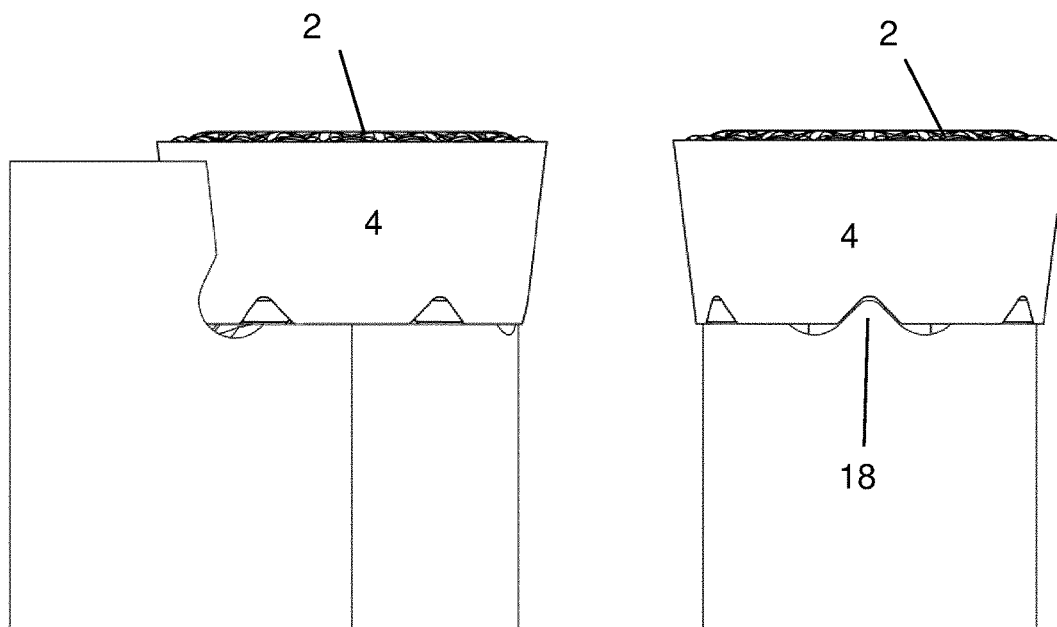
Fig. 19
Fig. 20

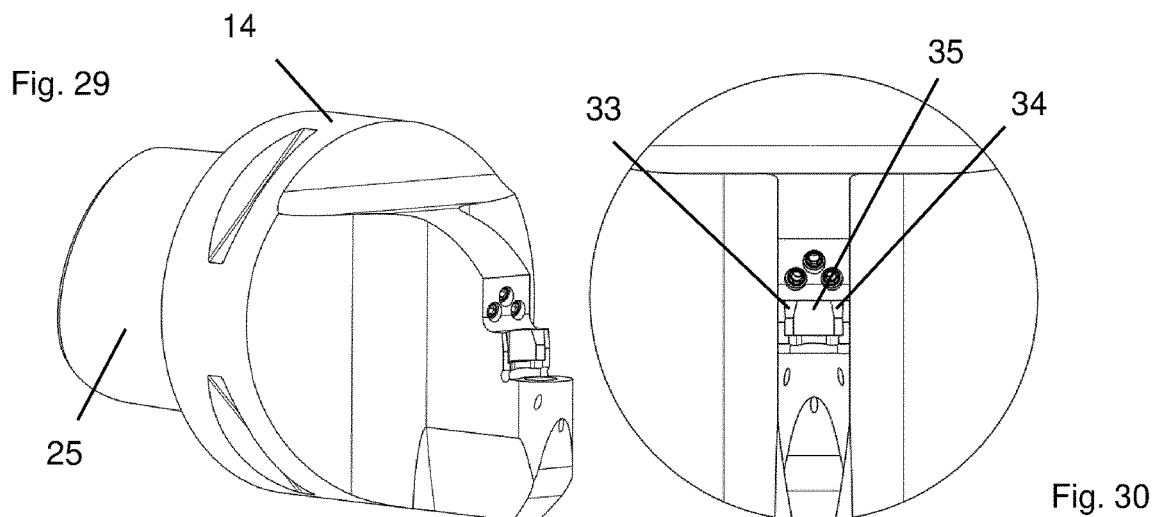
Fig. 29
Fig. 30
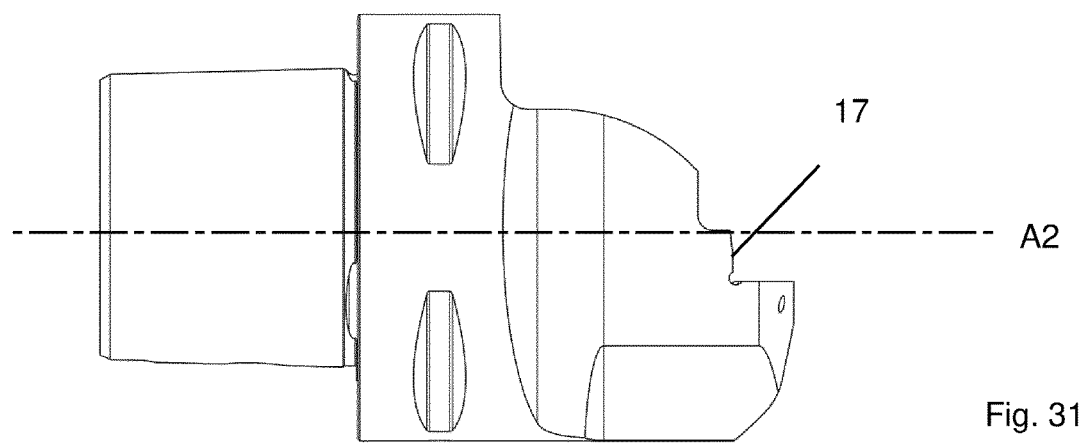
Fig. 31
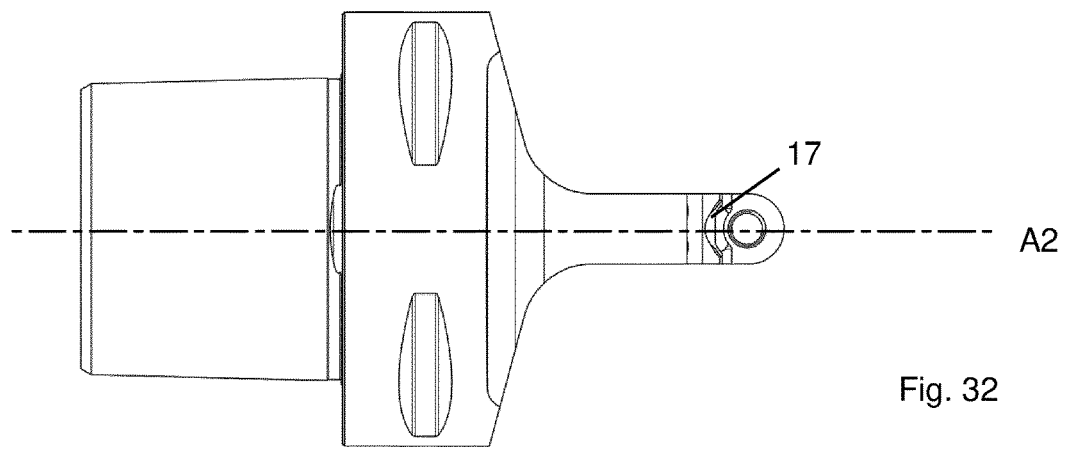
Fig. 32

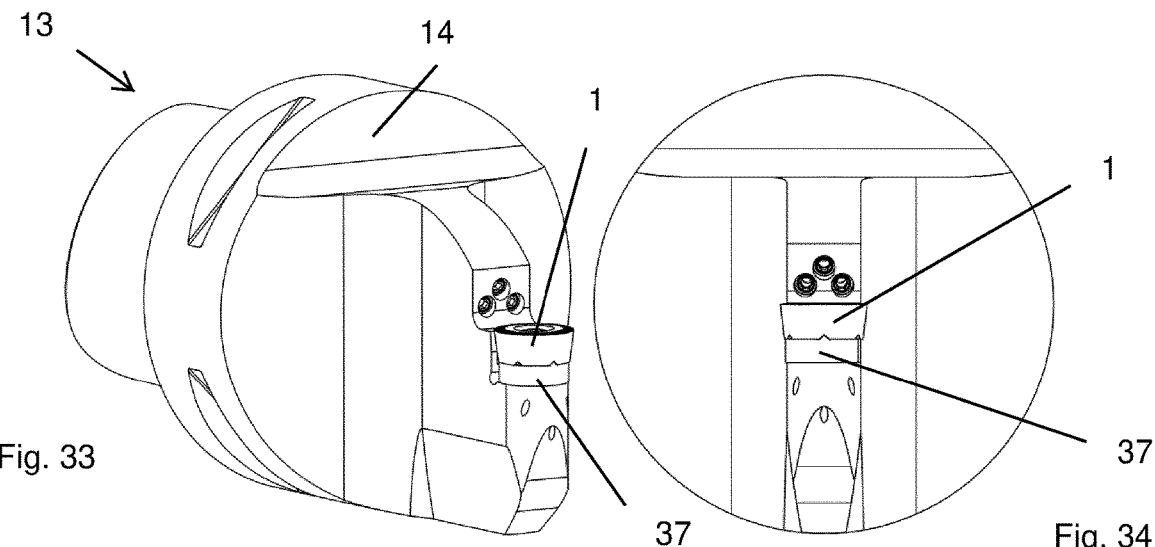
Fig. 33
Fig. 34
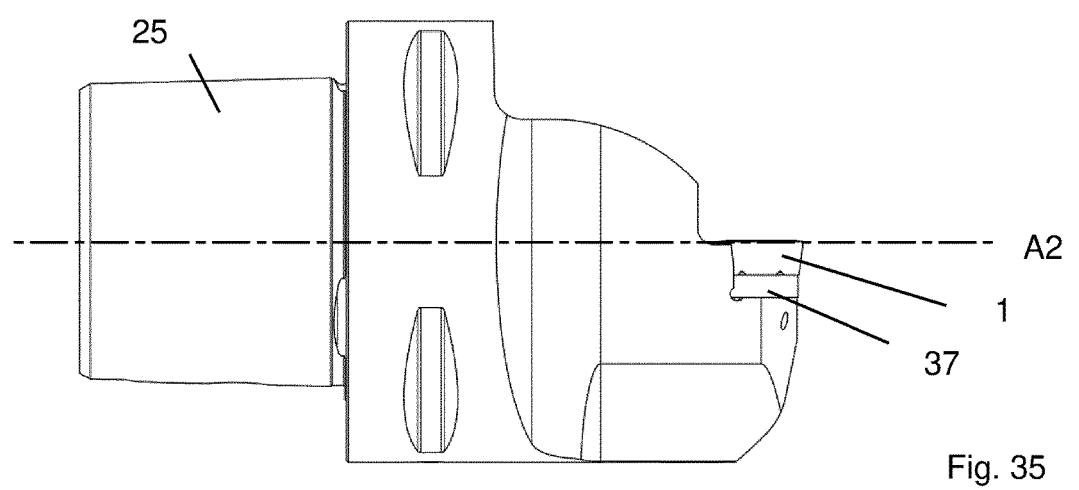
Fig. 35
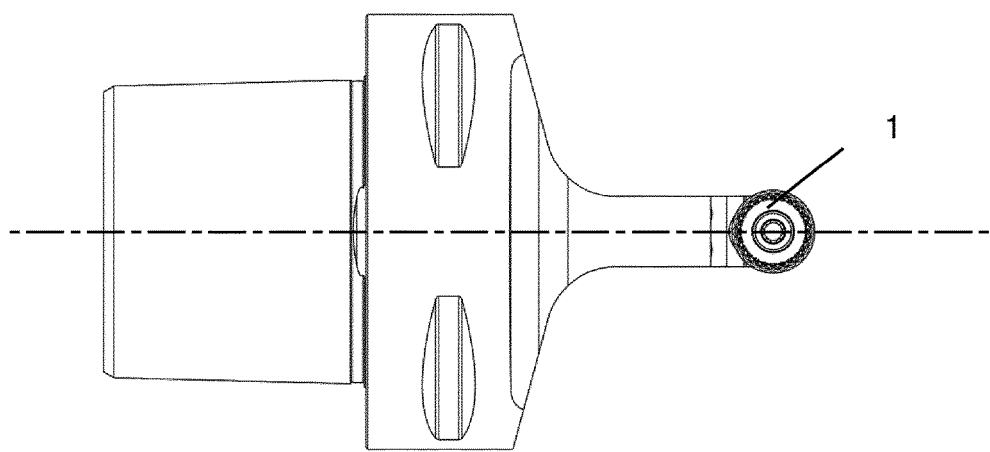
Fig. 36

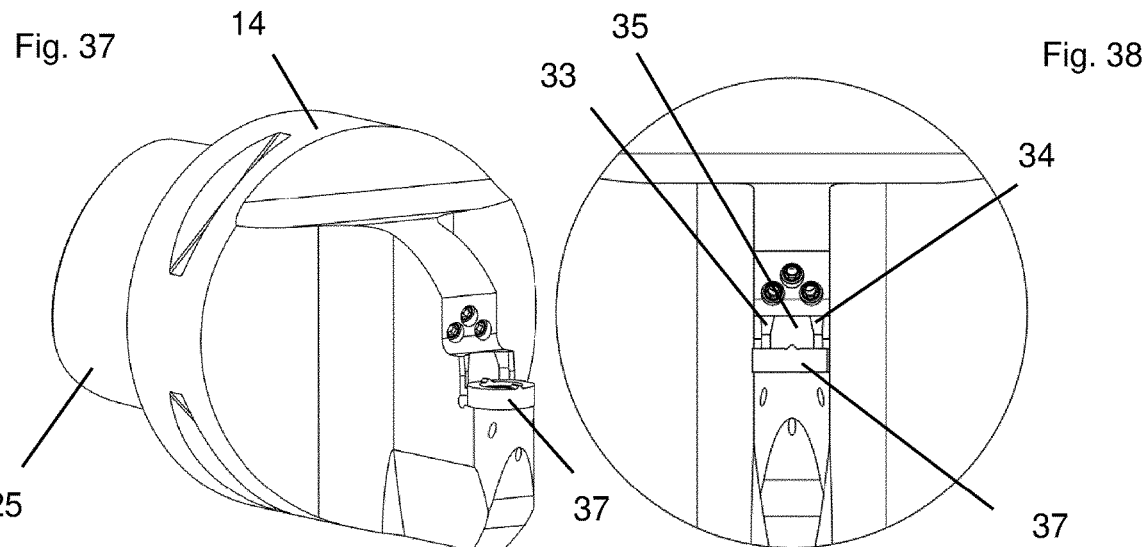
Fig. 37
Fig. 38
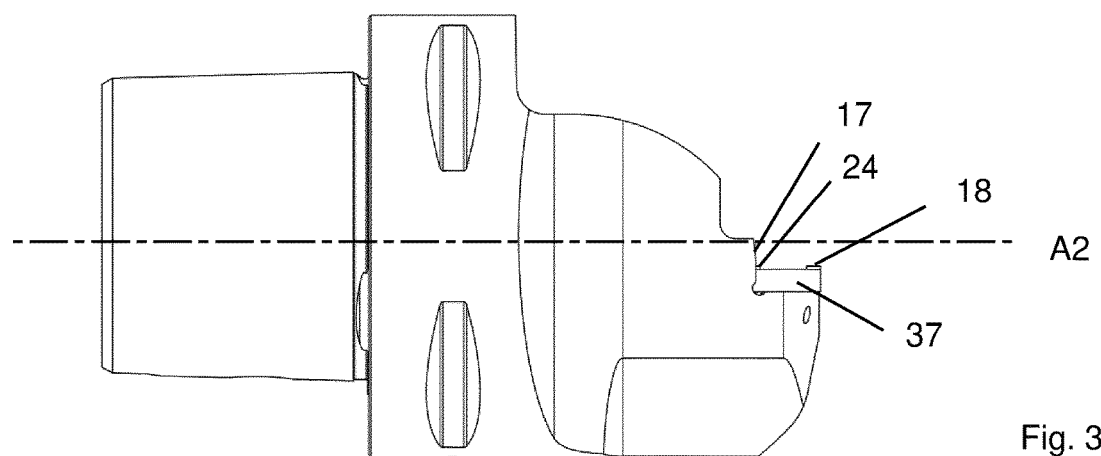
Fig. 39
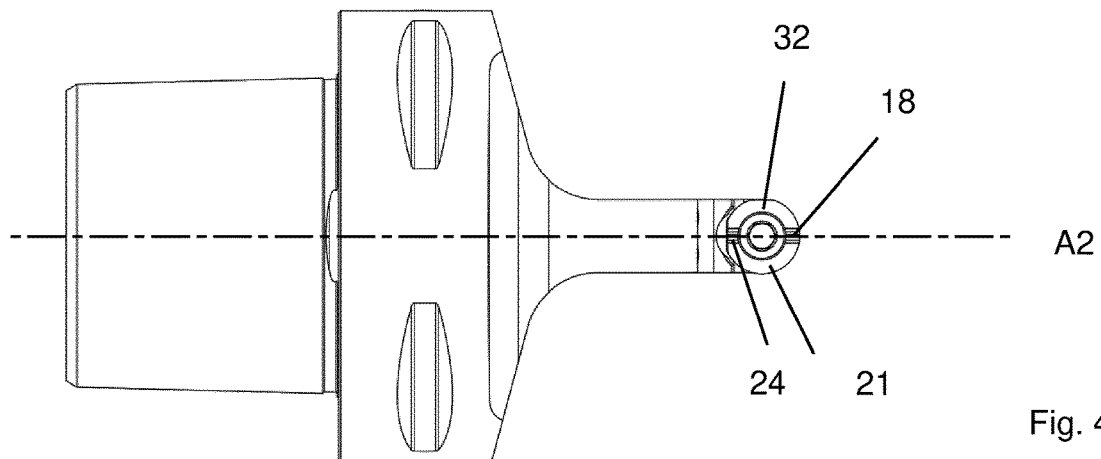
Fig. 40

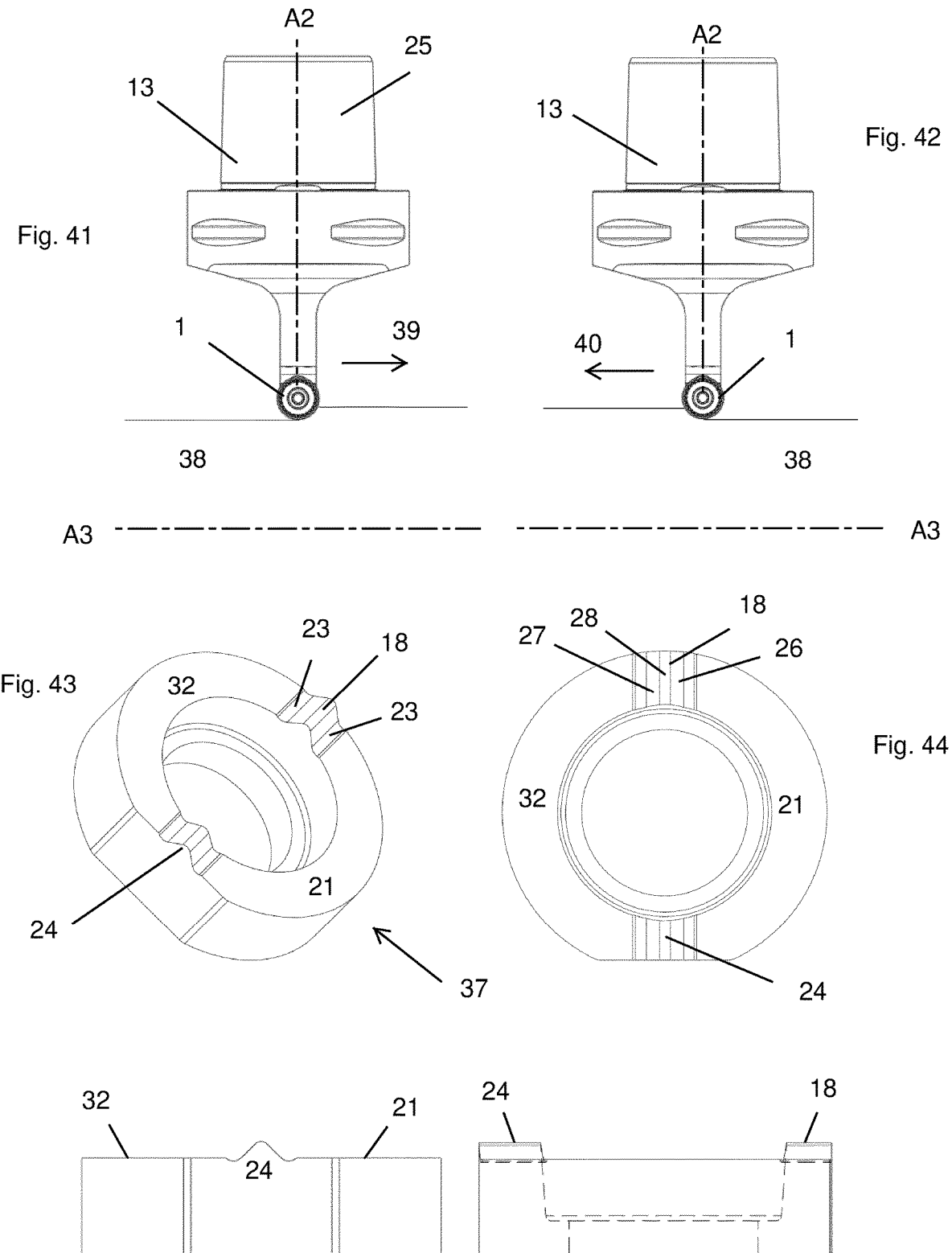

TURNING INSERT FOR METAL CUTTING

RELATED APPLICATION DATA

This application is a § 371 National Stage Application of PCT International Application No. PCT/EP2020/052926 filed Feb. 6, 2020 claiming priority to EP 19174816.9 filed May 16, 2019.

TECHNICAL FIELD OF THE INVENTION

The present invention belongs to the technical field of metal cutting. More specifically the present invention belongs to the field of tools for turning comprising a round turning insert.

BACKGROUND OF THE INVENTION AND PRIOR ART

The present invention refers to a turning insert according to the preamble of claim 1. In other words, the present invention relates to a turning insert comprising a top surface, an opposite bottom surface, a reference plane between the top and bottom surfaces, a center axis intersecting the top and bottom surfaces, a side surface connecting the top surface and the bottom surface, a cutting edge adjacent to the top surface and the side surface, the cutting edge being circular and concentric in relation to the center axis, wherein the bottom surface comprises a set of radial grooves.

In turning of a metal work piece, the metal work piece rotates around a center axis. A turning tool is used to remove material from the metal work piece. The turning tool normally comprises a turning insert. A turning insert may have different shape, depending on factors such as the type of turning operation and component design. One common type of turning inserts are round turning inserts, i.e. turning inserts having a circular cutting edge.

U.S. Pat. No. 7,607,867B2 disclose a turning tool comprising a turning insert having a circular cutting edge. The bottom surface of the turning insert comprises a plurality of radial grooves.

The inventors have found that there is a need for an improved turning insert.

SUMMARY OF THE INVENTION

An object of the present invention is to provide a turning insert having a circular cutting edge, which can be indexable in predetermined positions, which can give improved chip breaking both at low and high feed rates when used in more than one feed direction.

At least one of said objects is achieved by a turning insert comprising a top surface, an opposite bottom surface, a reference plane between the top and bottom surfaces, a center axis intersecting the top and bottom surfaces, a side surface connecting the top surface and the bottom surface, a cutting edge adjacent to the top surface and the side surface, the cutting edge being circular and concentric in relation to the center axis, wherein the top surface comprises a set of first protrusions, wherein a greatest distance from the reference plane to the first protrusions is greater than a distance from the reference plane to the cutting edge, wherein the bottom surface comprises a set of radial grooves, wherein the bottom surface comprises a set of flat surfaces, wherein the flat surfaces extend in a plane parallel to the reference plane, wherein in a top view each first protrusion is symmetrical in relation to a line extending between the center axis and a mid-point of the first protrusion, wherein the first protrusions are elongated in a direction parallel to the adjacent cutting edge.

By such a turning insert, chip breaking and/or chip control may be improved. The first protrusions bends the chip so it becomes more fragile. When turning using a round turning insert, the chip thickness varies. The thin part of the chip is controlled efficiently solely by the elongated first protrusions. By such a turning insert, indexing positions can be predetermined.

The turning insert preferably comprises a wear resistant material such as cemented carbide, cubic boron nitride or ceramic. The top surface comprises a rake surface. The bottom surface comprises a seating surface. The reference plane is mid-way between the top and bottom surfaces. The center axis intersecting the top and bottom surfaces is perpendicular to the reference plane. Preferably, a through hole is concentric with the center axis. The side surface connecting the top surface and the bottom surface comprises a clearance surface. The side surface is preferably conical. In other words, an area of the top surface is preferably greater than an area of the bottom surface. A cutting edge is adjacent to, i.e. connects or borders to the top surface and the side surface. The cutting edge is 360° circular in a top view and is concentric in relation to or with the center axis. The cutting edge may be entirely located in a plane parallel to the reference plane. The top surface comprises a set, i.e. a number of spaced apart first protrusions. A protrusion is a portion of the top surface which protrudes upwards, i.e. in a direction away from the reference plane, in relation to surrounding or adjacent portions of the top surface. Said first protrusions are spaced apart from the cutting edge. A greatest distance from the reference plane to the first protrusions is greater than a distance from the reference plane to the cutting edge, where said distances are measured perpendicular to the reference plane. In other words, in a side view, the first protrusions are at least partly above the cutting edge, where the top surface is upwards and the bottom surface is downwards. The bottom surface comprises a set of radial grooves. In other words, said grooves extend towards the center axis. Said grooves preferably intersect the side surface. Said grooves preferably have a constant width and height along the length of the groove. Preferably, the set of radial grooves are evenly distributed around the center axis. Preferably, each of said radial grooves are uniform in cross-sections. Preferably, the number of radial grooves is even. Preferably, the number of radial grooves is 6-20, even more preferably 6-12, still even more preferably 6. The bottom surface comprises a set of flat surfaces. Preferably, the number of flat surfaces is equal to the number of grooves. Preferably, the flat surfaces are formed between adjacent pairs of grooves. Preferably, the flat surfaces intersect the side surface. Preferably, the flat surfaces are spaced apart from the center axis. In a top view, each first protrusion is symmetrical, i.e. mirror-symmetrical in relation to a line extending between the center axis and a mid-point of the first protrusion. The first protrusions are elongated in a direction parallel to the adjacent, i.e. closest or neighboring part of the cutting edge. In other words, each of the first protrusions are elongated in a direction perpendicular to a radius extending from the center axis to a midpoint of the respective first protrusion. Preferably, the first protrusions are evenly spaced around the center axis. Preferably, seen in a side view, the top surface slopes downwards from the cutting edge towards the first protrusions. Preferably, the number of first protrusions is 10-40, even more preferably 16-32.

Preferably, each radial groove is aligned with a mid-point of a first protrusion. In other words, a plane comprising and parallel to the center axis is aligned with a center of a radial groove and intersects a mid-point of a first protrusion.

Preferably, in a top view a distance from the mid-point of the first protrusion to the adjacent cutting edge is 0.3-1.0 mm, even more preferably 0.4-0.8 mm. By such a turning insert, chip breaking is further improved especially at low feed rates.

According to an embodiment, the number of first protrusions is a multiple of the number of radial grooves.

By such a turning insert, chip breaking is more even for each indexing position.

Preferably, the number of first protrusions is two to six times the number of radial grooves.

According to an embodiment, a distance between adjacent first protrusions is smaller than a length of a first protrusion.

By such a turning insert, the chip breaking and/or chip control is even further improved, especially at low cutting depths.

In other words, in a top view, adjacent first protrusions are spaced apart by a distance which is less than the maximum length of a first protrusion, i.e. the length measured in a direction perpendicular to a radius intersecting the center axis and a mid-point of the first protrusion.

According to an embodiment, each first protrusion is convex in a radial cross section and in a cross-section perpendicular to the radial cross section.

By such a turning insert, the chip breaking and/or chip control is even further improved.

In other words, a top of the first protrusion is non-flat. At least an upper portion of the first protrusion is convex. A lower portion may be concave, to provide a smooth transformation to a surrounding area of the top surface.

According to an embodiment, the first protrusions are evenly distributed around the center axis.

By such a turning insert, the chip breaking and/or chip control is even further improved.

In other words, in a top view, an angle between adjacent first protrusions is constant, where said angle is measured between radial lines intersecting the center axis and midpoints of adjacent first protrusions.

According to an embodiment, the top surface is mirror symmetrical in relation to a plane comprising and parallel to the center axis.

By such a turning insert, chip breaking is more even when used in longitudinal turning in opposite directions.

According to an embodiment, in a top view the first protrusions are oval shaped or substantially oval shaped.

By such a turning insert, the chip breaking and/or chip control is even further improved.

Said oval is in a top view elongated in a direction perpendicular to a radius intersecting a mid-point of the respective first protrusion, where said radius intersects the center axis. Preferably, each first protrusion is 2-5 times longer in a direction parallel to the cutting edge than in a radial direction.

According to an embodiment, the top surface comprises a set of second protrusions, wherein a greatest distance from the cutting edge to the first protrusions is smaller than a greatest distance from the cutting edge to the second protrusions.

By such a turning insert, the chip breaking and/or chip control is even further improved. The second protrusions bends or breaks the chip. The second protrusions are raised relative to the first protrusions to ensure chip forming takes place even if the first protrusions lift the chip. The thick part of the chip is partly controlled by the first protrusions, but mainly by the second protrusions.

The top surface comprises a set of preferably at least partly spaced apart second protrusions. The second protrusions protrude in a direction away from the reference plane in relation to at least some adjacent portions of the top surface.

According to an embodiment, a distance from the reference plane to the first protrusions is smaller than a distance from the reference plane to the second protrusions.

By such a turning insert, the chip breaking and/or chip control is even further improved. The second protrusions are raised relative to the first protrusions to ensure chip forming takes place even if the first protrusions lift the chip.

A distance from the cutting edge to top portions of the respective first protrusions is smaller than a distance from the cutting edge to top portions the respective second protrusions. In other words, in a side view at least portions of both the first protrusions and the second protrusions is above the cutting edge, where the top surface is upwards, and the bottom surface is downwards. Further, in the same view, at least portions of the second protrusions are above all portions of the first protrusions.

According to an embodiment, the first protrusion comprises a first surface facing the cutting edge, wherein the second protrusions comprises a second surface facing the cutting edge, wherein a greatest angle of the first surface in relation to the reference plane is smaller than a greatest angle of the second surface in relation to the reference plane.

By such a turning insert, chip breaking and/or chip control is further improved. At high feed and/or for the thick part of the chip, a steeper angle of the second surface of the higher second protrusion ensures a more aggressive bending of the chip.

Formulated differently, in radial cross sections, the maximum angle of the second protrusion is greater than the maximum angle of the first protrusion, where said angles are measured in relation to the reference plane. Said cross sections intersect respective mid-points of the respective first and second protrusions. Said angles are measured in respective radial planes intersecting mid-points of the first and second protrusion, respectively. Said first and second surfaces are chip forming- and/or chip breaking surfaces.

According to an embodiment, the number of first protrusions is equal to the number of second protrusions, wherein the first protrusions are identical or substantially identical, wherein the second protrusions are identical or substantially identical, wherein the first protrusions are smaller than the second protrusions when seen in a top view, wherein the first protrusions are at a constant distance or substantially constant distance from the center axis, wherein the second protrusions are at a constant distance or substantially constant distance from the center axis, wherein the second protrusions extend radially from a circular or substantially circular ring concentric with the center axis.

By such a turning insert, chip breaking and/or chip control is further improved.

The surface around the hole is preferably raised to the top of the second protrusions in order to increase resistance to wear of the second protrusions. In other words, said circular ring decreases the wear of the second protrusions.

The first protrusions are thus identical or substantially identical in shape. The second protrusions are thus identical or substantially identical in shape. The first and second protrusions, respectively, more precisely mid-points of respective first and second protrusions, are at a constant distance or substantially constant distance from the center axis. The second protrusions extend radially, towards the cutting edge, from a circular or substantially circular ring, i.e. a circumferential portion, concentric with the center axis. Said ring is preferably raised in relation to the cutting edge. Said ring is preferably raised in relation to the first protrusions.

According to an embodiment, the first and second protrusions radially overlap when seen in a top view, wherein the first and the second protrusions, respectively, are uniformly distributed around the center axis.

By such a turning insert, chip breaking and/or chip control is further improved.

The first and second protrusions thus partially overlap radially when seen in a top view. In other words, there exist radii which intersect a first protrusion and a second protrusion, seen in a top view, where said radii extend from the center axis to the cutting edge. The first and the second protrusions, respectively, are uniformly or evenly distributed around the center axis. In other words, adjacent pairs of first protrusions form a constant angle, 360° divided by the number of first protrusions, in relation to the center axis when seen in a top view. In a corresponding manner, adjacent pairs of second protrusions form a constant angle, 360° divided by the number of second protrusions, in relation to the center axis when seen in a top view. Said angles are equal.

In other words, radially overlap means that the sum of radial angles $\alpha 1$, $\alpha 2$ for the first protrusions and the second protrusions exceeds 360°.

According to an embodiment, the radial grooves are aligned with mid-points of first or second protrusions.

By such a turning insert, chip breaking can be more even when machining in opposite directions longitudinally.

In other words, each radial groove is aligned with mid-points of first protrusions or mid-point of second protrusions. In other words, a plane comprising and parallel to the center axis is aligned with a center of a radial groove and intersects a mid-point of a first protrusion or a mid-point of a second protrusion.

According to an embodiment, a turning tool comprises a tool body and a turning insert according to one of the above described embodiments, wherein the turning tool comprises an insert seat, wherein the insert seat comprises a bottom surface and a rear surface, wherein the turning insert is mounted in the insert seat, wherein the bottom surface of the insert seat comprises a first ridge, wherein the side surface of the turning insert is in contact with the rear surface of the insert seat, wherein the first ridge is inside one of the radial grooves formed in the bottom surface of the turning insert.

By such a turning tool, rotation of the turning insert may be reduced. Such a turning tool can be manufactured in an economical manner.

The grooves and the ridge are arranged such that a small rotation, i.e. between 0° and 1°, even more preferably between 0° and 0.5°, of the turning insert around the center axis thereof is possible. The grooves and the ridge are arranged such that a rotation above 1°, preferably above 0.5°, is prevented. There is a vertical gap between the first ridge and the turning insert, where vertical means in a direction parallel to the center axis of the turning insert.

According to an embodiment, the bottom surface of the insert seat comprises one or more support surfaces, wherein the support surfaces extends in a common plane, wherein the flat surfaces of the turning insert is in contact with the support surfaces.

According to an embodiment, a method to machine a metal work piece comprises the steps of providing a metal work piece, providing the above described turning tool, rotating the metal work piece around a rotational axis thereof, arranging the turning tool such that the first ridge is oriented perpendicular to the rotational axis of the metal work piece, cutting the metal work piece by moving the turning tool in a first direction parallel to the rotational axis of the metal work piece, and cutting the metal work piece by moving the turning tool in a second direction parallel to the rotational axis of the metal work piece, where the second direction is opposite to the first direction.

The metal work piece rotates in the same direction around the rotational axis thereof during the machining in the first and second directions.

DESCRIPTION OF THE DRAWINGS

The present invention will now be explained in more detail by a description of embodiments of the invention and by reference to the accompanying drawings.

FIG. 5 is a is a cross-sectional view taken along line 5-5 of FIG. 3
FIG. 6 is a is a cross-sectional view taken along line 6-6 of FIG. 3
FIG. 7 is a perspective view of the turning insert in FIG. 1 where the bottom surface is shown
FIG. 8 is a bottom view of the turning insert in FIG. 1
FIG. 17 is a perspective view of the insert seat in FIG. 13 and the turning insert in FIG. 1
FIG. 18 is a top view of FIG. 17
FIG. 19 is a side view of FIG. 17
FIG. 20 is a front view of FIG. 17
FIG. 29 is a perspective view of a tool body
FIG. 30 is a front view of FIG. 29
FIG. 31 is a side view of FIG. 29
FIG. 32 is a top view of FIG. 29
FIG. 33 is a perspective view of a turning tool comprising the tool body in FIG. 29, the turning insert in FIG. 1 and the shim in FIG. 43
FIG. 34 is a front view of FIG. 33
FIG. 35 is a side view of FIG. 33
FIG. 36 is a top view of FIG. 33

FIG. 37 is a perspective view of the tool body in FIG. 29 and the shim in FIG. 43

FIG. 38 is a front view of FIG. 37

FIG. 39 is a side view of FIG. 37

FIG. 40 is a top view of FIG. 37

FIG. 41 is a schematic view of turning using the turning tool in FIG. 25

FIG. 42 is a schematic view of turning using the turning tool in FIG. 25

FIG. 43 is a perspective view of a shim

FIG. 44 is a top view of the shim in FIG. 43

FIG. 45 is a front view of the shim in FIG. 43

FIG. 46 is a transparent side view of the shim in FIG. 43

Figure 1:
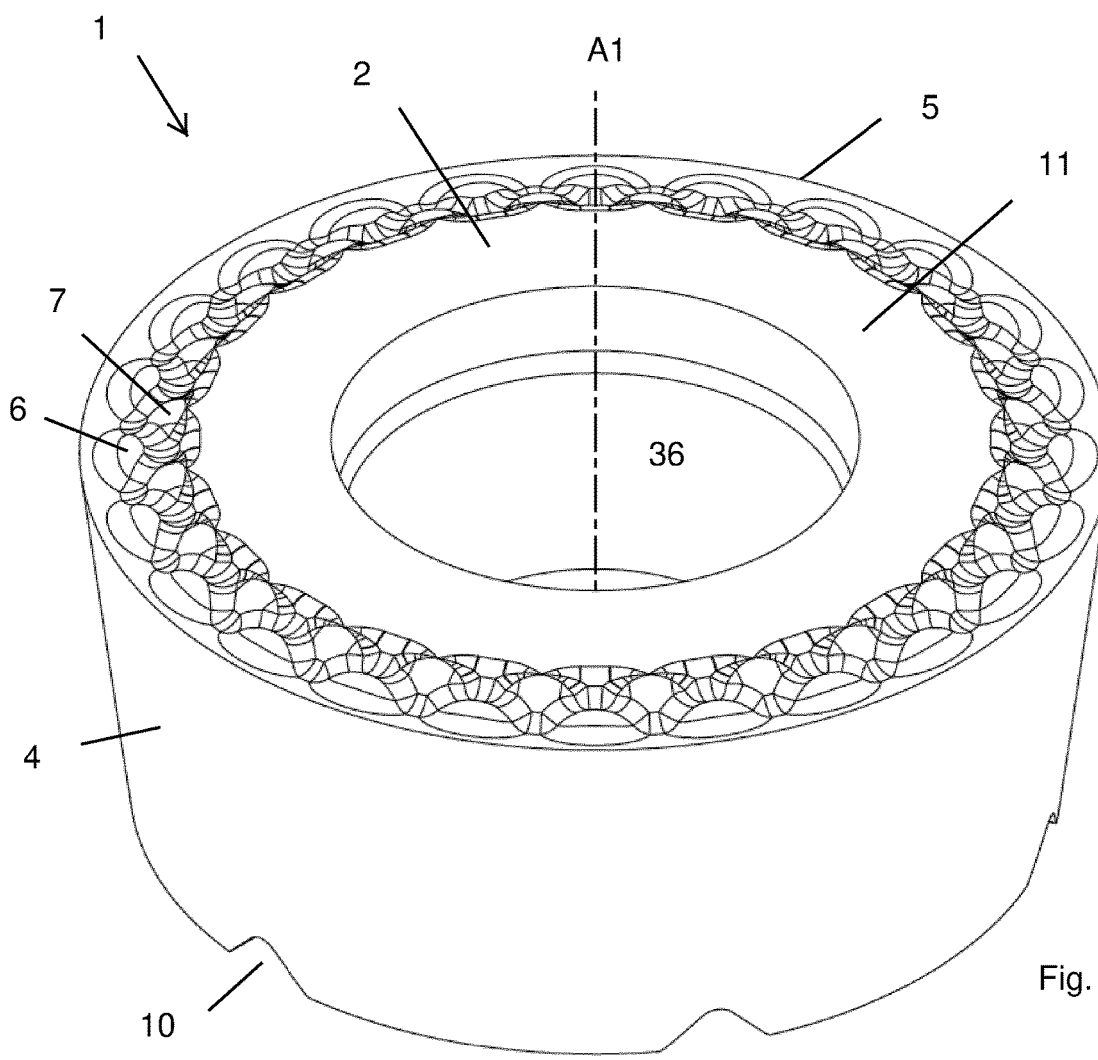
FIG. 1 is a perspective view of a turning insert
Figure 2:
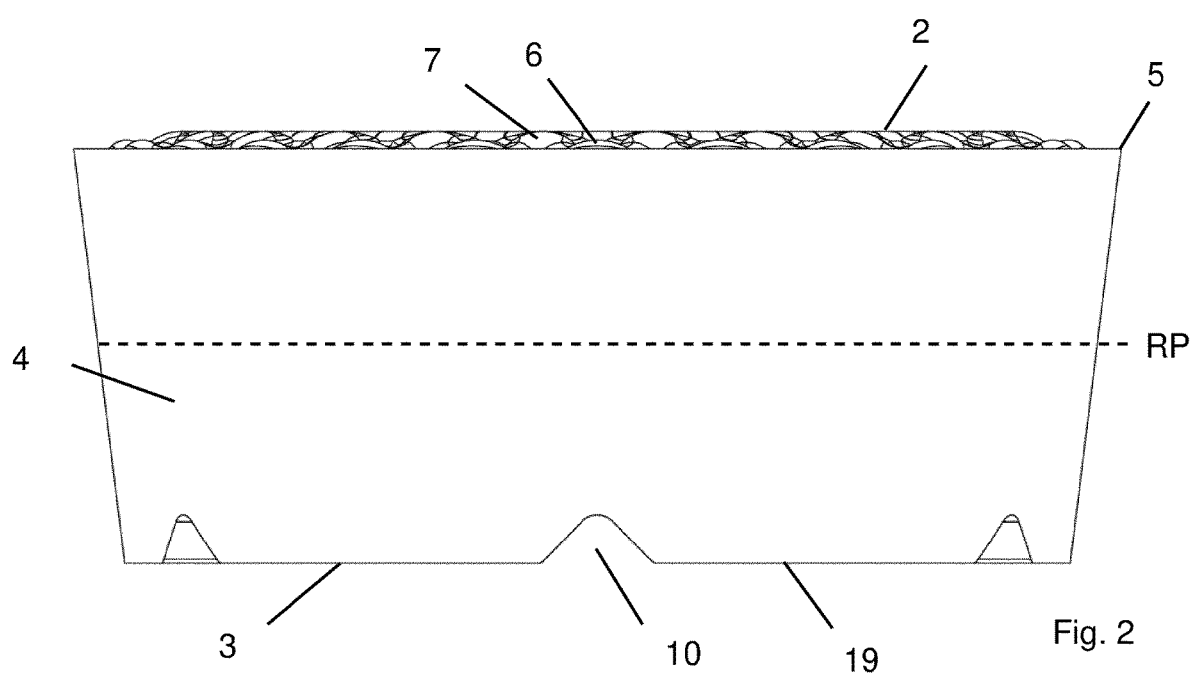
FIG. 2 is a front view of the turning insert in FIG. 1

All turning insert figures have been drawn to scale.

DETAILED DESCRIPTION OF EMBODIMENTS OF THE INVENTION

Reference is made to FIGS. 1-3, 7 and 8 which show a turning insert 1. The turning insert 1 comprises a top surface 2 comprising a rake surface and an opposite bottom surface 3 functioning as a seating surface. A reference plane RP extends mid-way between the top and bottom surfaces 2, 3. A center axis A1 intersects the top and bottom surfaces 2, 3. A side surface 4 connects the top surface 2 and the bottom surface 3. A cutting edge 5 is adjacent to the top surface 2 and the side surface 4. The cutting edge 5 is circular and concentric in relation to a center axis A1. A through hole 36 for a screw extends between the top and bottom surfaces 2, 3. The top surface 2 comprises a set of first protrusions 6.

As can be seen in FIGS. 5 and 6, a greatest distance from the reference plane RP to the first protrusions 6 is greater than a distance from the reference plane RP to the cutting edge 5.

As can best be seen in e.g. FIG. 8, the bottom surface 3 comprises a set of radial grooves 10 and a set of flat surfaces 19. The flat surfaces 19, arranged to function as support surfaces or contact surfaces, extend in a plane parallel to the reference plane RP.

Figure 3:
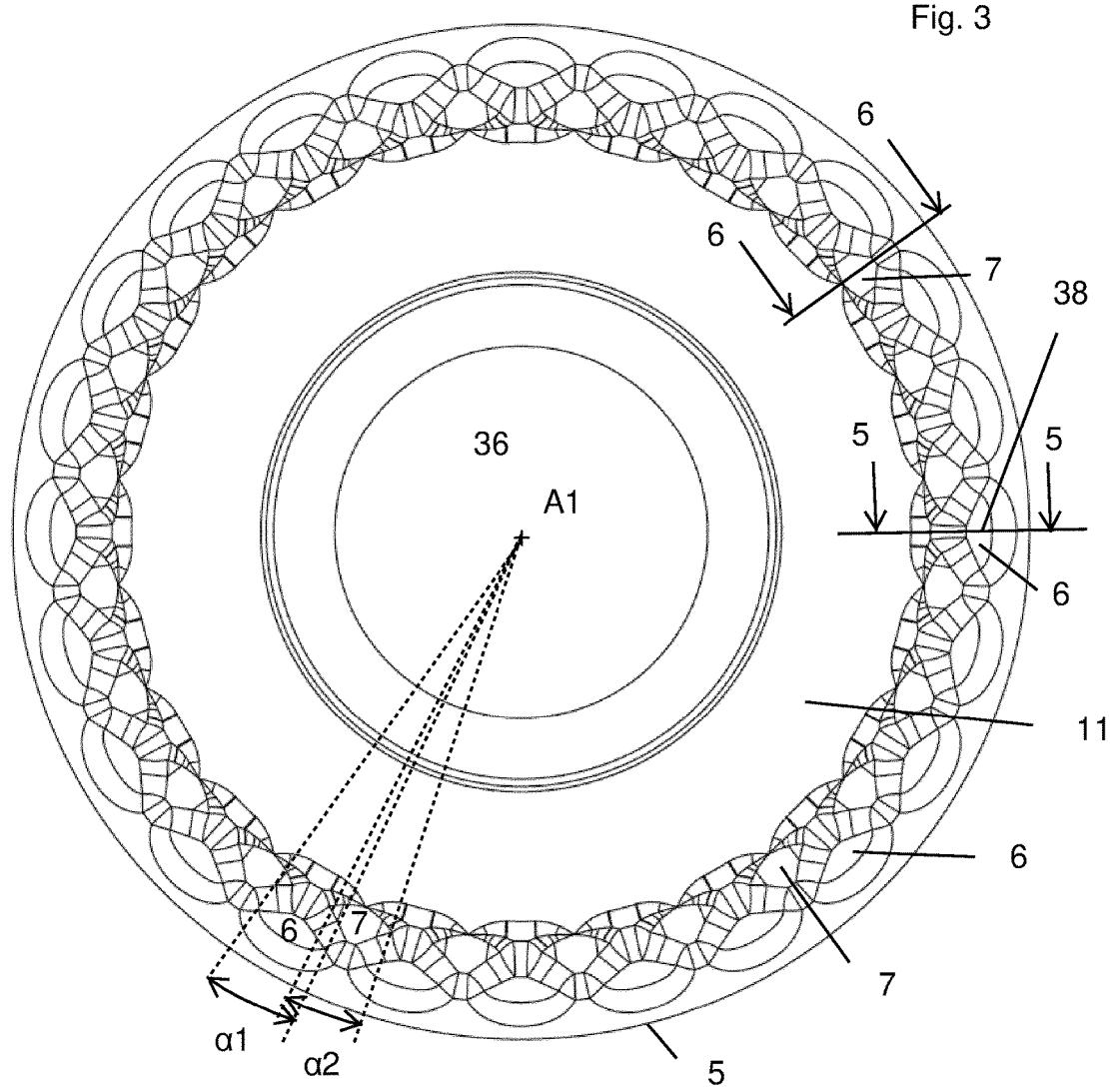
FIG. 3 is a top view of the turning insert in FIG. 1

In a top view as in FIG. 3, each first protrusion 6 is symmetrical in relation to a line extending between the center axis A1 and a midpoint 45 of the first protrusion 6. The first protrusions 6 are elongated in a direction parallel to or substantially parallel to the adjacent cutting edge 5.

The number of first protrusions 6 is a multiple of the number of radial grooves 10.

Figure 4:
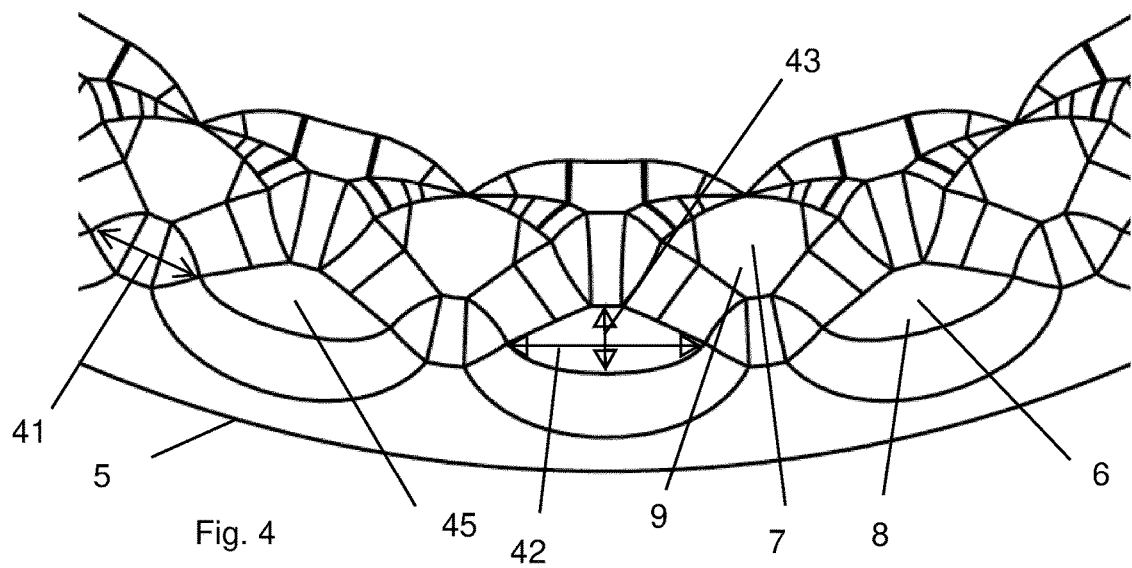
FIG. 4 is a magnified view of a section of FIG. 3

As can be seen in FIG. 4, a distance 41 between adjacent first protrusions 6 is smaller than a length 42 of a first protrusion 6.

As seen in FIG. 5, each first protrusion 6 is convex in a radial cross section.

The first protrusions 6 are evenly distributed around the center axis A1, and are located at constant distance from the center axis A1.

As can be seen in FIG. 3, a radial angle α1 for a first protrusion 6 is greater than a radial angle α2 of a second protrusion 7, where said angles are measured between radial lines intersecting end points of the respective protrusion 6, 7. The first and second protrusions 6, 7 radially overlap when seen in a top view. The sum of radial angles α1, α2 for the first protrusions 6 and the second protrusions 7 exceeds 360°.

The first and the second protrusions 6, 7, respectively, are uniformly distributed around the center axis A1.

As can be seen in e.g. FIG. 3 the top surface 2 of the turning insert 1 is mirror symmetrical in relation to a plane comprising the center axis A1. The number of first protrusions 6 is equal to the number of second protrusions 7. The first protrusions 6 are identical. The second protrusions 7 are identical.

In a top view the first protrusions 6 are oval shaped or substantially oval shaped. Said oval is in a top view elongated in a direction perpendicular to a radius intersecting a mid-point of the respective first protrusion, where said radius intersects the center axis. In other words, a length 42 of a first protrusion 6 is greater than a width 43 of a first protrusion 6, where said width 43 is measured radially in a top view and where said length is measured perpendicular to said width 43, as seen in FIG. 4.

The top surface 2 comprises a set of second protrusions 7. As can be seen in e.g. FIG. 3, a greatest distance from the cutting edge 5 to the first protrusions 6 is smaller than a greatest distance from the cutting edge 5 to the second protrusions 7. In other words, the first protrusions 6 are closer to the cutting edge 5, while the second protrusions 7 are closer to the center axis A1. As can be seen in FIGS. 5 and 6, the top surface 2 slopes downwards from the cutting edge 5.

As seen in FIGS. 5 and 6, a distance from the reference plane to the first protrusions 6 is smaller than a distance from the reference plane to the second protrusions 7. As seen in e.g. FIG. 5, the first protrusion 6 comprises a first surface 8 facing the cutting edge 5. As seen in e.g. FIG. 6, the second protrusions 7 comprises a second surface 9 facing the cutting edge 5. A greatest angle θ1 of the first surface 8 in relation to the reference plane RP is smaller than a greatest angle θ2 of the second surface 9 in relation to the reference plane RP.

The first protrusions 6 are smaller in width, i.e. radially, than the width of the second protrusions 7 when seen in a top view.

The first protrusions 6 are at a constant distance or substantially constant distance from the center axis A1.

The second protrusions 7 are at a constant distance or substantially constant distance from the center axis A1.

The second protrusions 7 extend radially from a circular or substantially circular ring 11, i.e. a ring-shaped protrusion, concentric with the center axis A1. The first protrusions 6 are spaced apart from said circular ring 11.

The radial grooves 10 are aligned with mid-points of first or second protrusions 6, 7.

FIGS. 25-28 show a turning tool 13 comprising a tool body 14 and the above described turning insert 1. The tool body 14 is shown in detail in FIGS. 21-24. The turning tool 13 comprises an insert seat 15. The insert seat 15 comprises a bottom surface 16 and a rear surface 17. The turning insert 1 is mounted in the insert seat 15. The bottom surface 16 of the insert seat 15 comprises a first ridge 18.

The side surface 4 of the turning insert 1 is in contact with the rear surface 17 of the insert seat 15.

The first ridge 18 is inside one of the radial grooves 10 formed in the bottom surface 3 of the turning insert 1.

The grooves and the ridge are arranged such that a small rotation, i.e. between 0° and 1°, even more preferably between 0° and 0.5°, of the turning insert around the center axis thereof is possible. The grooves and the ridge are arranged such that a rotation above 1°, preferably above 0.5°, is prevented.

The bottom surface 16 of the insert seat 15 comprises support surfaces 21, 32 extending in a common plane. The flat surfaces 19 of the turning insert 1 is in contact with the support surfaces 21, 32.

The turning insert 1 is mounted in the insert seat 15 by means of a screw (not shown).

Figure 9:
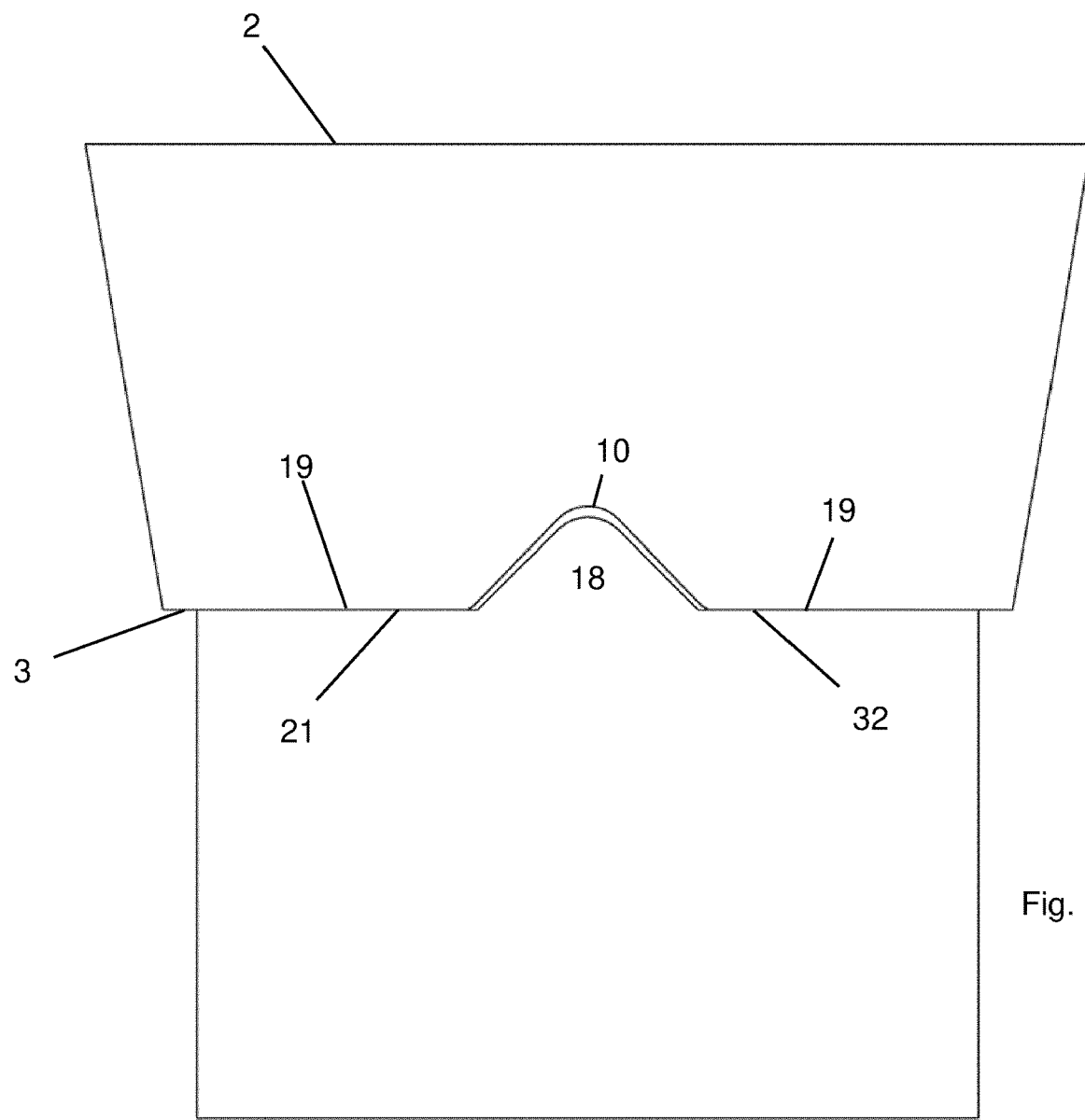
FIG. 9 is a schematic cross-sectional view of a turning insert mounted in an insert seat
Figure 10:
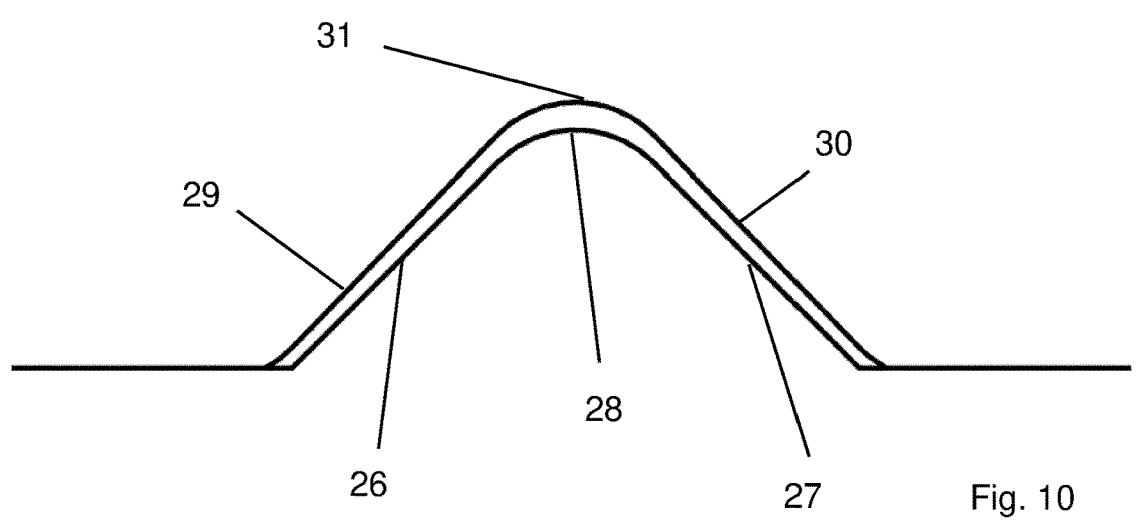
FIG. 10 is a magnified view of a section of FIG. 9

As seen in FIGS. 9 and 10, the first ridge 18 is smaller than one of the radial grooves 10 when seen in a cross-section perpendicular to the main extension of said one of the radial grooves 10. Said first ridge 18 is inside or contained within said one of the radial grooves 10.

A hole 36 for the screw is connecting the top and bottom surfaces 2, 3 of the turning insert 1. A threaded hole 22 for said screw intersects the bottom surface 16 of the insert seat 15.

The screw preferably comprises a screw head and an external thread. A through hole 36 for the screw is connecting the top and bottom surfaces 2, 3 of the turning insert 1. The bottom surface 16 of the insert seat 15 comprises a threaded hole 22 for the screw. The screw is at least partly located inside said hole 36 formed in the insert and at least partly inside said threaded hole 22.

The radial grooves 10 intersect the hole 36 formed in the turning insert 1. The radial grooves 10 extend radially between the hole 36 and the side surface 4.

The bottom surface 16 of the insert seat 15 comprises seat grooves 23. The first ridge 18 is formed between the seat grooves 23. The first ridge 18 and the seat grooves 23 are at least partially located on opposite sides in relation to a plane comprising the support surfaces 21, 32.

Figure 14:
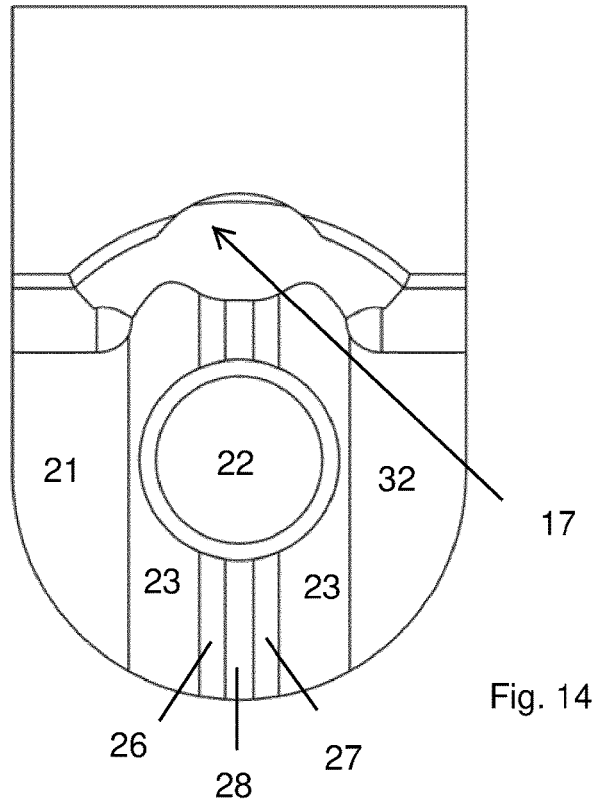
FIG. 14 is a top view of FIG. 13
Figure 15:
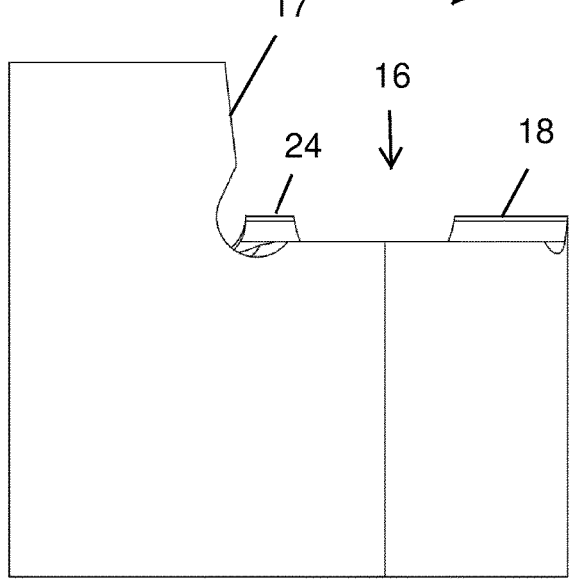
FIG. 15 is a side view of FIG. 13
Figure 16:
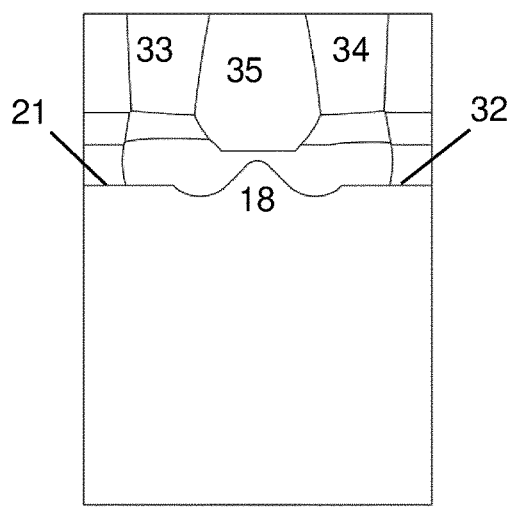
FIG. 16 is a front view of FIG. 13
Figure 21:
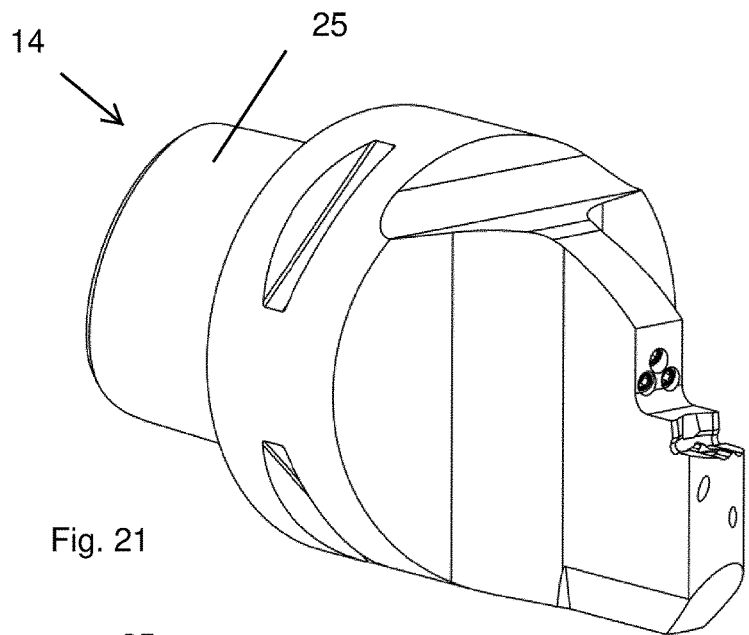
FIG. 21 is a perspective view of a tool body comprising the insert seat in FIG. 13
Figure 22:
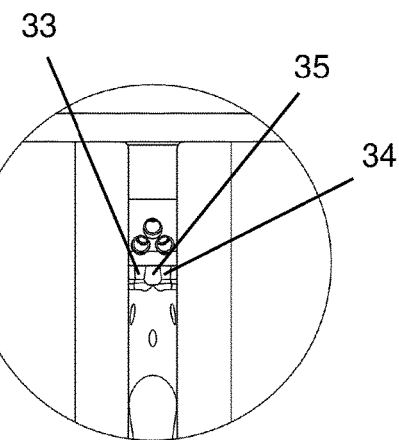
FIG. 22 is a front view of FIG. 21
Figure 23:
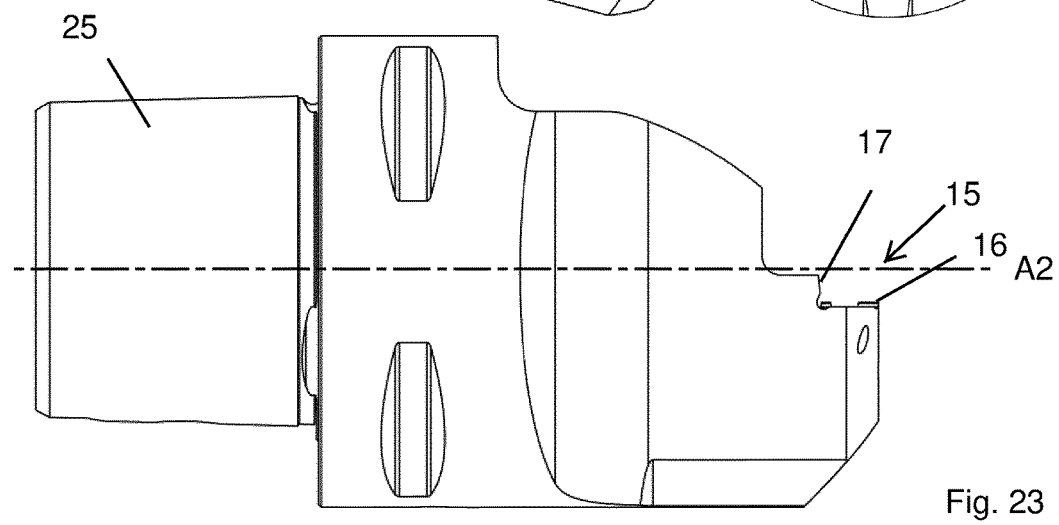
FIG. 23 is a side view of FIG. 21
Figure 24:
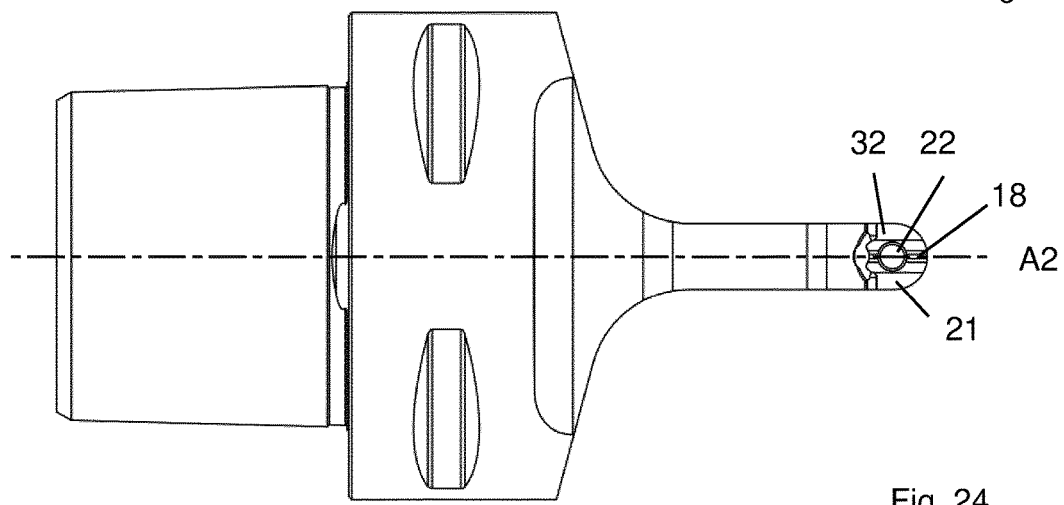
FIG. 24 is a top view of FIG. 21
Figure 25:
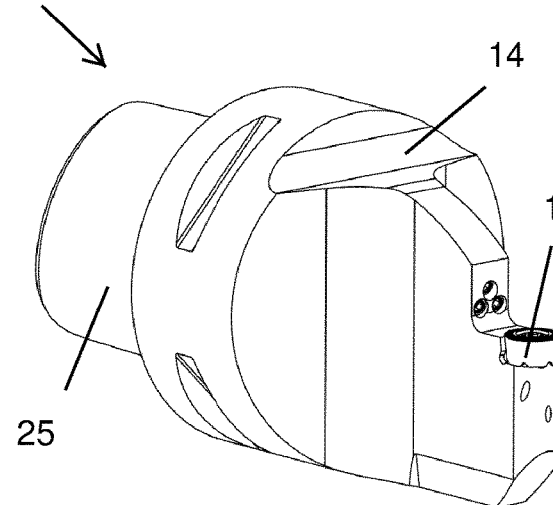
FIG. 25 is a perspective view of a turning tool comprising the tool body in FIG. 21 and the turning insert in FIG. 1
Figure 26:
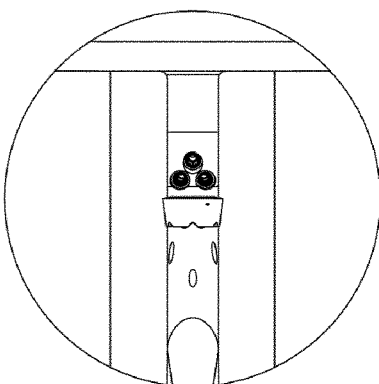
FIG. 26 is a front view of FIG. 25
Figure 27:
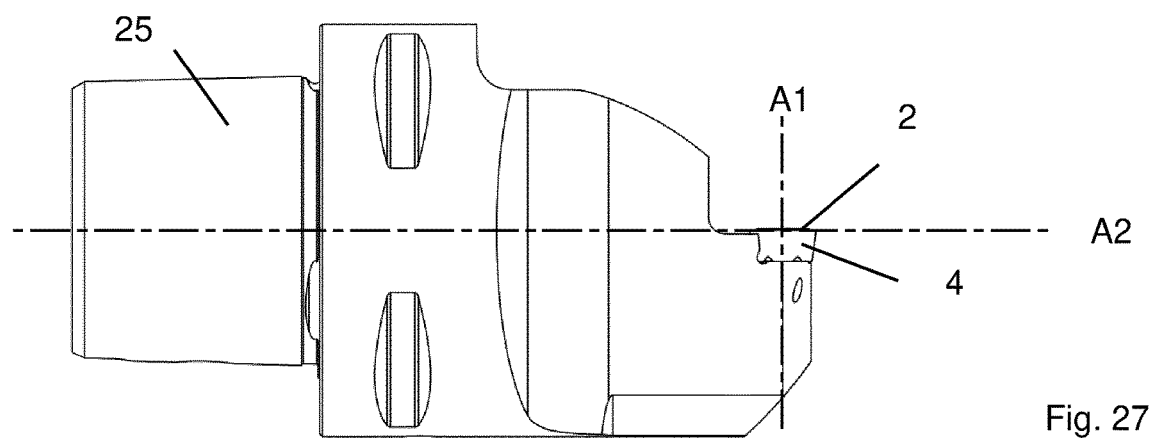
FIG. 27 is a side view of FIG. 25
Figure 28:
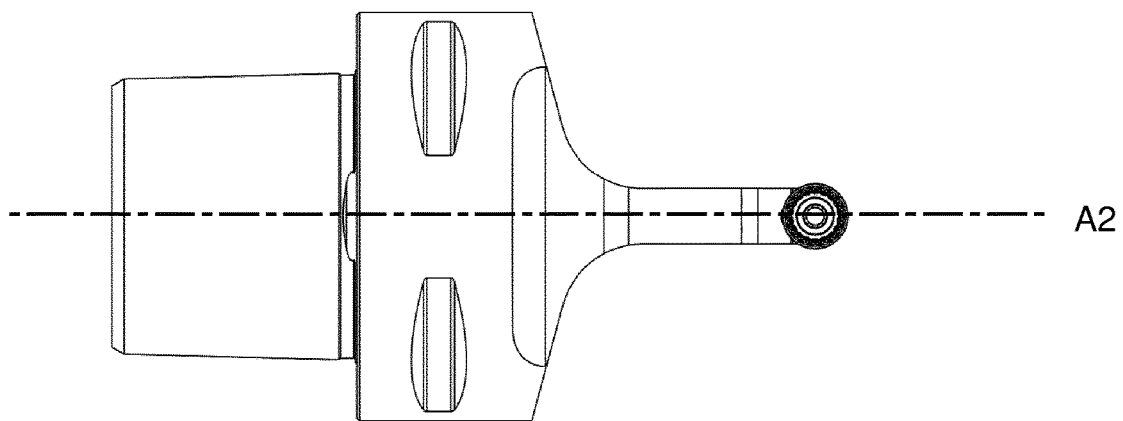
FIG. 28 is a top view of FIG. 25

The bottom surface 16 of the insert seat 15 comprises a second ridge 24. The first ridge 18 and the second ridge 24 are aligned in a top view as seen in e.g. FIG. 14. The first and second ridges 18, 24 are spaced apart and separated by the hole 22 formed in the bottom surface 16 of the insert seat 15. The first ridge 18 is longer than the second ridge 24 when seen in a top view. The first ridge 18 and the second ridge 24 are separated by 180° in a top view. The first ridge 18 and the second ridge 24 are aligned with the longitudinal axis A2 of the turning tool 13, or aligned with a line parallel to said longitudinal axis A2, when seen in a top view.

The tool body 14 comprises a rear end coupling portion 25 suitable to be connected to a machine interface (not shown) of a CNC-lathe (not shown). The coupling portion 25 extends along a longitudinal axis A2 of the turning tool 13. The first and second ridges 18, 24 extends primarily along or parallel to the longitudinal axis A2 of the turning tool 13.

The first ridge 18 has a main extension thereof along or parallel to the longitudinal axis A2 of the turning tool 13 when seen in a top view.

The center axis A1 of the turning insert 1 is perpendicular or substantially perpendicular to the longitudinal axis A2 of the turning tool 13.

The first ridge 18, the second ridge 24 and the radial grooves 10 formed in the bottom surface 3 of the turning insert 1 have corresponding or substantially corresponding shapes in cross sections, as seen in FIGS. 9 and 10.

The number of ridges 18, 24 formed in the bottom surface 16 of the insert seat 15 is smaller than the number of radial grooves 10 formed in the bottom surface 3 of the turning insert 1.

As seen in FIGS. 9 and 10, the first ridge 18 comprises planar ridge side surfaces 26, 27 connected by a ridge crest 28. The ridge side surfaces 26, 27 form an angle of 70-110° in relation to each other. Each radial groove 10 comprises radial groove side surfaces 29, 30 connected by a radial groove root 31. The radial groove side surfaces 29, 30 form an angle of 70-110° in relation to each other. Each radial groove 10 is uniform or substantially uniform in cross sections along the length of the radial groove, where the length is in a radial direction. In a corresponding manner, the first and second ridges 18, 24 are uniform or substantially uniform.

A gap is formed at least between one of the pair of adjacent ridge side- and radial groove side surfaces 26, 29, 27, 30. In FIG. 10, a gap is formed between both of said adjacent pairs of side surfaces 26, 29, 27, 30. A gap is always formed between the ridge crest 28 and the radial groove root 31.

The bottom surface 16 of the insert seat 15 comprises two support surfaces 21, 32 located in a common plane. In a top view as seen in e.g. FIG. 14, an area of the support surfaces 21, 32 are greater than an area of the ridge or ridges 18, 24.

As seen in e.g. 16, the rear surface 17 of the insert seat 15 comprises two spaced apart rear contact surfaces 33, 34. The rear contact surfaces 33, 34 are separated by a recess 35.

The tool body 14 may comprise the insert seat 15 as seen in FIGS. 21-24. In such a case, the bottom surface 3 and the side surface 4 of the turning insert 1 is partly in contact with the tool body 14, as seen in FIGS. 25-28. Alternatively, the turning tool 13 may comprise a shim 37, such as the shim 37 shown in FIGS. 43-46. In such case, as seen in FIGS. 33-36, the bottom surface 3 of the turning insert 1 is in contact with the shim 37, while the side surface 4 of the turning insert 1 is in contact with the tool body 14.

FIGS. 41 and 42 schematically show a method to machine a metal work piece 38 by means of any of the above described turning tools 13. The metal work piece 38 rotates in one direction around a rotational axis A3 thereof. The first ridge is oriented perpendicular to the rotational axis A3 of the metal work piece 38. Cutting the metal work piece 38 is made by first moving the turning tool 13 in a first direction 39 parallel to the rotational axis A3 of the metal work piece 38, and thereafter cutting the metal work piece 38 by moving the turning tool 13 in a second direction 40 parallel to the rotational axis A3 of the metal work piece 38, where the second direction 40 is opposite to the first direction 39.

Figure 11:
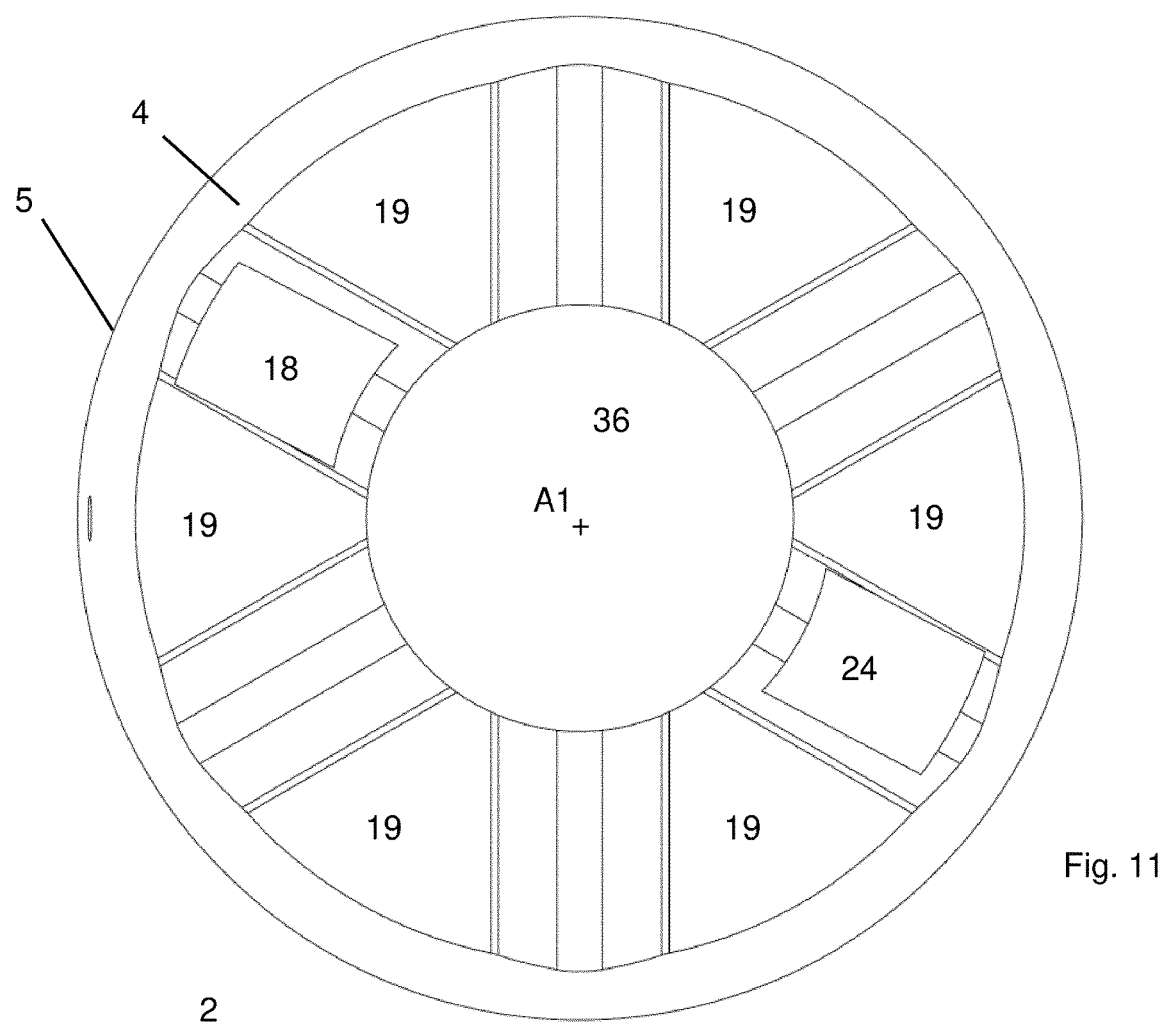
FIG. 11 is a bottom view of the turning insert in FIG. 1 and portions of a bottom surface of an insert seat
Figure 12:
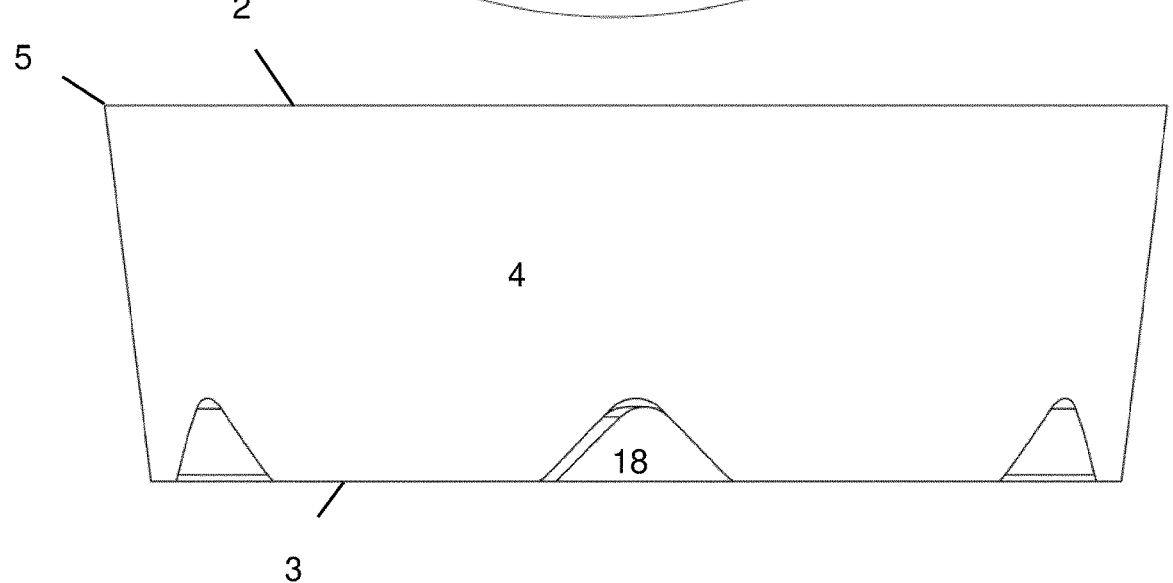
FIG. 12 is a side view of FIG. 11
Figure 13:
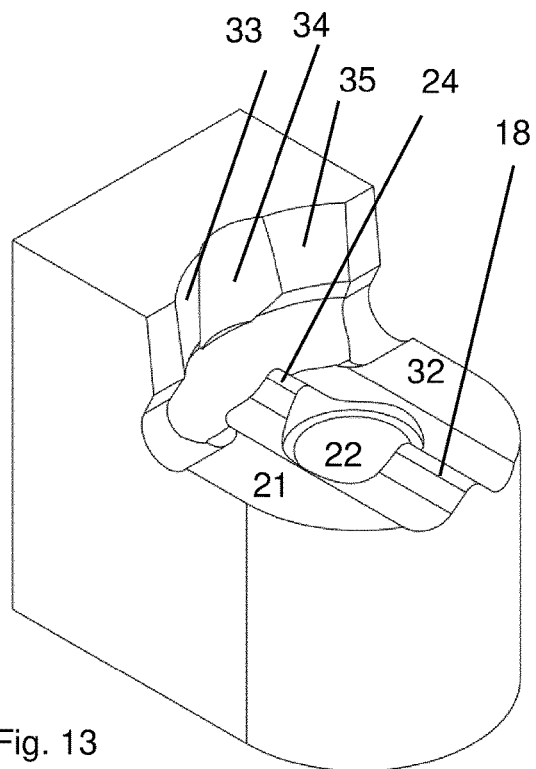
FIG. 13 is a perspective view of an insert seat for the turning insert in FIG. 1

In FIG. 41, one ridge surface 27 as seen in FIG. 10 is in contact with one radial groove side surface 30, while in FIG. 42, one other ridge surface 26 is in contact with one other radial groove side surface 29. Thus, the turning insert have made a rotational movement of a predetermined angle around the center axis thereof when comparing the end of the pass shown in FIG. 41 and the end of the pass shown in FIG. 42. In other words, in FIG. 41, there is at least a partial gap between the other ridge surface 26 and the one other radial groove side surface 29. In a corresponding manner, in FIG. 42 there is at least a partial gap between said one ridge surface 27 and said one radial groove side surface 30. In other words, the ridge crest 28 seen in FIG. 10 forms an angle in a top view in relation to the radial groove root 31. This can be understood from FIG. 11.

The invention claimed is:

1. A turning insert comprising:
   a top surface;
   an opposite bottom surface;
   a reference plane extending between the top and bottom surfaces;
   a center axis intersecting the top and bottom surfaces;
   a side surface connecting the top surface and the bottom surface; and
   a cutting edge adjacent to the top surface and the side surface, the cutting edge being circular and concentric in relation to the center axis, wherein the bottom surface includes a set of radial grooves, wherein the bottom surface includes a set of flat surfaces, wherein the flat surfaces extend in a plane parallel to the reference plane, wherein the top surface comprises includes a set of first protrusions, wherein a greatest distance from the reference plane to the first protrusions is greater than a distance from the reference plane to the cutting edge, wherein in a top view each first protrusion is symmetrical in relation to a line extending between the center axis and a mid-point of the first protrusion, and wherein the first protrusions are elongated in a direction parallel to the adjacent cutting edge.

2. The turning insert according to claim 1, wherein a number of first protrusions of the set of first protrusions is a multiple of a number of radial grooves of the set of radial grooves.

3. The turning insert according to claim 1, wherein a distance between adjacent first protrusions is smaller than a length of a first protrusion.

4. The turning insert according to claim 1, wherein each first protrusion is convex in a radial cross section and in a cross-section perpendicular to the radial cross section.

5. The turning insert according to claim 1, wherein the first protrusions are evenly distributed around the center axis.

6. The turning insert according to claim 1, wherein the top surface is mirror symmetrical in relation to a plane including and parallel to the center axis.

7. The turning insert according to claim 1, wherein in a top view the first protrusions are oval shaped or substantially oval shaped.

8. The turning insert according to claim 1, wherein the top surface comprises includes a set of second protrusions, wherein a greatest distance from the cutting edge to the first protrusions is smaller than a greatest distance from the cutting edge to the second protrusions.

9. The turning insert according to claim 8, wherein a distance from the reference plane to the first protrusions is smaller than a distance from the reference plane to the second protrusions.

10. The turning insert according to claim 8, wherein the first protrusion comprises includes a first surface facing the cutting edge, wherein the second protrusions comprises includes a second surface facing the cutting edge, wherein a greatest angle of the first surface in relation to the reference plane is smaller than a greatest angle of the second surface in relation to the reference plane.

11. The turning insert according to claim 8, wherein a number of first protrusions is equal to a number of second protrusions, wherein the first protrusions are identical or substantially identical, wherein the second protrusions are identical or substantially identical, wherein the first protrusions are smaller than the second protrusions when seen in a top view, wherein the first protrusions are at a constant distance or substantially constant distance from the center axis, wherein the second protrusions are at a constant distance or substantially constant distance from the center axis, wherein the second protrusions extend radially from a circular or substantially circular ring concentric with the center axis.

12. The turning insert according to claim 8, wherein the first and second protrusions radially overlap when seen in a top view, wherein the first and the second protrusions, respectively, are uniformly distributed around the center axis.

13. The turning insert according to claim 8, wherein the radial grooves are aligned with mid-points of first or second protrusions.

14. A turning tool comprising:
a tool body;
a turning insert according to claim 1; and
an insert seat, wherein the insert seat includes a bottom surface and a rear surface, wherein the turning insert is mounted in the insert seat, wherein the bottom surface of the insert seat includes a first ridge, wherein the side surface of the turning insert is in contact with the rear surface of the insert seat, and wherein the first ridge is inside one of the radial grooves formed in the bottom surface of the turning insert.

15. The turning tool according to claim 14, wherein the bottom surface of the insert seat includes one or more support surfaces, wherein the support surfaces extends in a common plane, wherein the flat surfaces of the turning insert are in contact with the support surfaces.

16. A method to machine a metal work piece, comprising the steps of:
providing a metal work piece;
providing a turning tool according to claim 13;
rotating the metal work piece around a rotational axis thereof;
arranging the turning tool such that the first ridge is oriented perpendicular to the rotational axis of the metal work piece;
cutting the metal work piece by moving the turning tool in a first direction parallel to the rotational axis of the metal work piece; and
cutting the metal work piece by moving the turning tool in a second direction parallel to the rotational axis of the metal work piece, where the second direction is opposite to the first direction.

* * * * *